US011822531B2

(12) United States Patent
Das et al.

(10) Patent No.: US 11,822,531 B2
(45) Date of Patent: Nov. 21, 2023

(54) METHOD AND SYSTEM FOR USING AUXILIARY TABLES FOR RDF DATA STORED IN A RELATIONAL DATABASE

(71) Applicant: Oracle International Corporation, Redwood Shores, CA (US)

(72) Inventors: Souripriya Das, Nashua, NH (US); Matthew Steven Perry, Brookline, NH (US); Eugene Inseok Chong, Concord, MA (US)

(73) Assignee: Oracle International Corporation, Redwood Shores, CA (US)

( * ) Notice: Subject to any disclaimer, the term of this patent is extended or adjusted under 35 U.S.C. 154(b) by 49 days.

(21) Appl. No.: 17/643,166

(22) Filed: Dec. 7, 2021

(65) Prior Publication Data

US 2023/0177037 A1    Jun. 8, 2023

(51) Int. Cl.
  G06F 17/30    (2006.01)
  G06F 16/22    (2019.01)
  G06F 16/28    (2019.01)
  G06F 16/242   (2019.01)

(52) U.S. Cl.
  CPC ...... *G06F 16/2282* (2019.01); *G06F 16/2433* (2019.01); *G06F 16/284* (2019.01)

(58) Field of Classification Search
  CPC ........ G06F 16/13; G06F 16/24; G06F 16/156; G06N 3/00; G06N 5/00; G05B 13/00
  See application file for complete search history.

(56) References Cited

U.S. PATENT DOCUMENTS

| | | | | |
|---|---|---|---|---|
| 2011/0225167 A1* | 9/2011 | Bhattacharjee | ....... | G06F 16/284 |
| | | | | 711/E12.001 |
| 2012/0102022 A1* | 4/2012 | Miranker | .............. | G06F 16/258 |
| | | | | 707/E17.014 |
| 2012/0303668 A1* | 11/2012 | Srinivasan | ............ | G06F 16/288 |
| | | | | 707/792 |
| 2014/0214857 A1* | 7/2014 | Srinivasan | .............. | G06F 16/80 |
| | | | | 707/748 |
| 2016/0092554 A1* | 3/2016 | Srinivasan | .......... | G06F 16/9024 |
| | | | | 707/798 |
| 2016/0371355 A1* | 12/2016 | Massari | .............. | G06F 16/2228 |

OTHER PUBLICATIONS

Duval, D., et al., "Querying RDF Databases with Sub-CONSTRUCTs," T. Kutsia (Ed.): Symbolic Computation in Software Science (SCSS'21), dated 2021.
Tomaszuk, D., et al., "RDF 1.1: Knowledge Representation and Data Integration Language for the Web," Submitted to Symmetry, dated 2020.
Zou, L., et al., "Graph-Based RDF Data Management," CrossMark, Data Sci. Eng. (2017) 2:56-70, DOI 10.1007/s41019-016-0029-6, dated Feb. 4, 2017.

(Continued)

*Primary Examiner* — Hung D Le
(74) *Attorney, Agent, or Firm* — Vista IP Law Group, LLP

(57) ABSTRACT

Disclosed is an improved approach to represent RDF data in a database system, where one or more auxiliary tables are maintained for the RDF data. The auxiliary tables advantageously permit a database processing system to process a query using fewer numbers of joins or self-joins.

33 Claims, 21 Drawing Sheets

(56) References Cited

OTHER PUBLICATIONS

Sequeda, J., et al., "On Directly Mapping Relational Databases to RDF and OWL," WWW2012—Session: Ontology Representation and Querying: RDF and SPARQL, dated Apr. 2012.

Wylot, M., et al., "RDF Data Storage and Query Processing Schemes: A Survey," ACM Computing Surveys 51(4):1-36, dated Sep. 2018.

Yuan, P., et al., "TripleBit: a Fast and Compact System for Large Scale RDF Data," The 39th International Conference on Very Large Data Bases, Aug. 26-30, 2013.

Runge, L., et al., "Systematical Representation of RDF-to-Relational Mappings for Ontology-Based Data Access," Georg-August University of Gottingen, Institute of Computer Science, dated 2017.

Malyshev, S., et al., "Getting the Most out of Wikidata: Semantic Technology Usage in Wikipedia's Knowledge Graph," Semantic Scholar, dated 2018.

Hartig, O., et al., "Federated Semantic Data Management," Report from Dagstuhl Seminar, Dagstuhl Reports, vol. 7, Issue 06, pp. 135-167, dated 2017.

Lopes, N., et al., "On the Semantics of Heterogeneous Querying of Relational, XML and RDF Data with XSPARQL," Digital Enterprise Research Institute, National University of Ireland Galway, Ireland, dated 2011.

Aberger, C., et al., "Old Techniques for New Join Algorithms: A Case Study in RDF Processing," dated Feb. 2016.

Erxleben, F., et al., "Introducing Wikidata to the Linked Data Web," dated 2014.

\* cited by examiner

302 →

```
@prefix : <http://www.example.com#>

:john
    :fname "John" ;
    :lname "Brown" ;
    :height 72 ;
    :email "john@email.com" ;
    :email "johnnyB@email.com" ;
    :nickName "Johnny B" ;
    :friendOf :ann ;
    :address [
        :addrNum 20 ;
        :addrStreet "Elm Street" ;
        :addrCityState [
            :addrCity "Boston" ;
            :addrState "MA"
        ]
    ].
```

```
PREFIX : <http://www.example.com#>
SELECT *
WHERE {
    ?s :fname ?fname;
       :lname ?lname;
       :height ?height;
       :email ?email;
       :nickName ?nick;
       :friendOf ?friend;
       :address/:addrCityState/:addrState ?state .
}
```

```
SELECT
  T0.START_NODE_ID AS S$RDFVID,
  T1.CANON_END_NODE_ID AS LNAME$RDFVID,
  T5.CANON_END_NODE_ID AS FRIEND$RDFVID,
  T4.CANON_END_NODE_ID AS NICK$RDFVID,
  T8.CANON_END_NODE_ID AS STATE$RDFVID,
  T2.CANON_END_NODE_ID AS HEIGHT$RDFVID,
  T3.CANON_END_NODE_ID AS EMAIL$RDFVID,
  T0.CANON_END_NODE_ID AS FNAME$RDFVID,
  T0.START_NODE_ID AS BGP$1
FROM
  RDF_LINK$ T0,
  RDF_LINK$ T1,
  RDF_LINK$ T2,
  RDF_LINK$ T3,
  RDF_LINK$ T4,
  RDF_LINK$ T5,
  RDF_LINK$ T6,
  RDF_LINK$ T7,
  RDF_LINK$ T8
WHERE
  T0.P_VALUE_ID = 8337314745347241189 AND
  T1.P_VALUE_ID = 7644445801044650266 AND
  T2.P_VALUE_ID = 4791477124431525340 AND
  T3.P_VALUE_ID = 2930492586059823454 AND
  T4.P_VALUE_ID = 2558054308995111125 AND
  T5.P_VALUE_ID = 1285894645615718351 AND
  T6.P_VALUE_ID = 5055192271510902740 AND
  T7.P_VALUE_ID = 2282073771135796724 AND
  T8.P_VALUE_ID = 594560333771551504 AND
  T7.CANON_END_NODE_ID = T8.START_NODE_ID AND
  T0.START_NODE_ID = T1.START_NODE_ID AND
  T0.START_NODE_ID = T2.START_NODE_ID AND
  T0.START_NODE_ID = T3.START_NODE_ID AND
  T0.START_NODE_ID = T4.START_NODE_ID AND
  T0.START_NODE_ID = T5.START_NODE_ID AND
  T0.START_NODE_ID = T6.START_NODE_ID AND
  T6.CANON_END_NODE_ID = T7.START_NODE_ID
```

Fig. 3D

```
insert /*+ append */ into <SVP_table>
select stab.start_node_id
, ptab1.g_id g4791477124431525340, ptab1.canon_end_node_id p4791477124431525340
, ptab2.g_id g7644445801044650266, ptab2.canon_end_node_id p7644445801044650266
, ptab3.g_id g8337314745347241189, ptab3.canon_end_node_id p8337314745347241189
from
(select distinct start_node_id from <RDF_table>
 where p_value_id IN (
    8337314745347241189 /* :fname */
  , 7644445801044650266 /* :lname */
  , 4791477124431525340 /* :height */ )) stab
, (select * from <RDF_table> where p_value_id=4791477124431525340) ptab1
, (select * from <RDF_table> where p_value_id=7644445801044650266) ptab2
, (select * from <RDF_table> where p_value_id=8337314745347241189) ptab3
where stab.start_node_id = ptab1.start_node_id(+)
and stab.start_node_id = ptab2.start_node_id(+)
and stab.start_node_id = ptab3.start_node_id(+)
;
```

```
SELECT
  SVP0.START_NODE_ID AS S$RDFVID,
  SVP0.P_LNAME AS LNAME$RDFVID,
  MVP1.P_FRIENDOF AS FRIEND$RDFVID,
  T4.CANON_END_NODE_ID AS NICK$RDFVID,
  PCN0.P_STATE AS STATE$RDFVID,
  SVP0.P_HEIGHT AS HEIGHT$RDFVID,
  MVP0.P_EMAIL AS EMAIL$RDFVID,
  SVP0.P_FNAME AS FNAME$RDFVID,
  SVP0.START_NODE_ID AS BGP$1
FROM
  RDF_LINK$ T4,
  SVP_FNM_LNM_HGHT SVP0,
  PCN_ADDR_CITYSTATE_STATE PCN0,
  MVP_EMAIL MVP0,
  MVP_FRIENDOF MVP1
WHERE
  SVP0.P_FNAME IS NOT NULL AND
  SVP0.P_LNAME IS NOT NULL AND
  SVP0.P_HEIGHT IS NOT NULL AND
  T4.P_VALUE_ID = 2558054308995111125 AND
  SVP0.START_NODE_ID = MVP0.START_NODE_ID AND
  SVP0.START_NODE_ID = T4.START_NODE_ID AND
  SVP0.START_NODE_ID = MVP1.START_NODE_ID AND
  SVP0.START_NODE_ID = PCN0.START_NODE_ID
```

362 brackets the FROM clause entries.

Fig. 3L

METHOD AND SYSTEM FOR USING AUXILIARY TABLES FOR RDF DATA STORED IN A RELATIONAL DATABASE

BACKGROUND

The semantic web is very significant technology that has been developed for knowledge representation, discovery, and integration for data available on the World Wide Web. To model knowledge in a flexible and extensible way, the World Wide Web Consortium (W3C) has standardized the Resource Description Framework (RDF) to capture the semantics of data. RDF has now become a widely-used language (framework) for representing information (metadata) about resources in the World Wide Web. When information has been specified using the generic RDF format, it may be consumed automatically by a diverse set of applications.

There are two standard vocabularies defined on RDF: RDF Schema (RDFS) and the Web Ontology Language (OWL). These vocabularies introduce RDF terms that have special semantics in those vocabularies. For simplicity, in the rest of the document, the use of the term RDF will also implicitly include RDFS and OWL.

Facts in RDF are represented by RDF triples. Each RDF triple represents a fact and is made up of three parts, a subject, a predicate (sometimes termed a property), and an object (which may also be referred to herein as a value or object value). For example, the fact represented by the English sentence "John is 24 years old" can be represented in RDF by the subject, predicate, object triple <'John', 'age', '24'>, with 'John' being the subject, 'age' being the predicate, and '24' being the object. The subject can be a URI or blank node, the predicate can be a URI, and the object can be a URI, blank node, or literal.

In some cases, each RDF statement may include four components: Subject (S), Predicate (P), Object (O), and optionally, Named Graph (G). The term "named graph" refers to a technique for representing contextual information in an RDF dataset (DS). As previously noted, an RDF dataset is a set of triples of the form (s, p, o), where s refers to subject, p to predicate, and o to object. An "RDF quad" further qualifies the triple by adding the named graph g, which represents context, provenance or any additional information. The fourth component g can be specified as a URI. By convention, all RDF quads that share the same fourth component can be viewed to form a single named graph, thus RDF quad dataset can be viewed as a collection of one or more named graphs. Note that the special case where the fourth component is not specified is also treated as a named graph with the fourth component being blank (NULL).

The traditional approach of storing RDF quads in a relational database is to use an RDF table with at least four columns—one for each component of the 4-tuple <S, P, O, G>. Various approaches may be used to implement the exact schema to store the RDF data (e.g., using combinations of normalization/de-normalization techniques). However, conventional approaches to implement storage of RDF data in a relational database generally correlates to a table having a separate row for each RDF quad, with individual columns in that row that correlate to the subject, predicate, object/value, and/or graph for that RDF quad. For example, if a given subject (e.g., "John") is associated with two RDF quads (e.g., (1)<"John", "job", "dentist"> and (2)<"John", "address", "SanJose">), then each of these RDF quads would be represented as separate rows in an RDF table, with the first RDF quad <"John", "job", "dentist"> in a first row and the second RDF quad <"John", "address", "SanJose"> in a second row in the RDF table.

The problem addressed by this disclosure is that this approach to represent RDF data in a relational database may lead to inefficiencies when processing certain types of queries. For example, certain types of queries against the RDF table that seek to obtain information about the objects/values for a given subject need to perform an excessive number of self-joins on that table to put those atomic facts together. In the previously described example for subject "John", a self-join may need to be performed, for example, to process a query to obtain a result that joins the information/columns from both rows for the two RDF quads that are represented in the RDF table for the John subject. If the subject John is associated with many more RDF quads and hence is associated with many more rows in the RDF table for each of the RDF quads, then certain queries may require a large number of self-joins to satisfy the query. The potentially high count of self-joins causes slow query performance and puts stress on the query optimizer's ability to heuristically come up with an optimal execution plan.

Therefore, there is a need for an improved approach for implementing a database system to more efficiently process queries against RDF data.

SUMMARY

Some embodiments of the present invention are directed to an improved approach for representing RDF data in a database system, where one or more auxiliary tables are maintained for the RDF data. In some embodiments, the auxiliary tables may include SVP table(s), MVP table(s), and/or PCN tables. The auxiliary tables advantageously allow the database system to reduce the number of database joins that potentially need to be performed to process a query. In addition, query processing may generally become more efficient when directed to the auxiliary tables due to reduced rows to be processed by avoiding the larger number of rows in a base RDF table. Some embodiments also provide for automatic maintenance of the auxiliary tables when DML operations are performed at the base RDF table.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

The drawings illustrate the design and utility of some embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIGS. 3A-L provide an illustrative example of some embodiments of the invention.

DETAILED DESCRIPTION

Various embodiments will now be described in detail, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

Figure 1A:
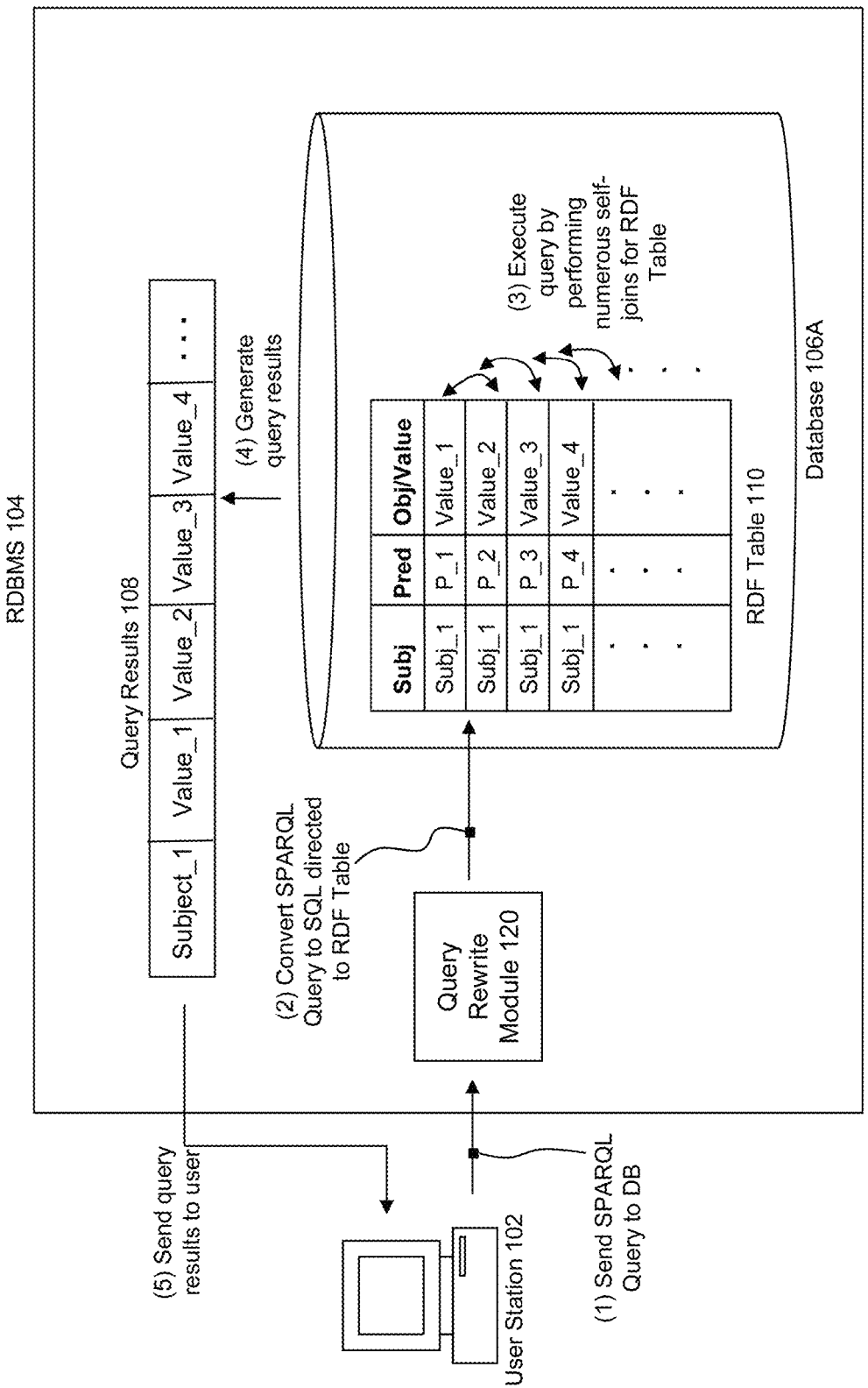
FIG. 1A illustrates RDF data represented without auxiliary tables.

As previously noted, the problem addressed by this disclosure is that the conventional approaches to represent RDF data in a relational database may lead to inefficiencies when processing certain types of queries. To explain, consider the RDF table 110 shown in FIG. 1A. Here, a separate row is created in RDF table 110 for each RDF triple for a given subject. Separate columns in that row correlate to the subject, predicate, and object/value for the RDF triple. While not shown in this table for the sake of simplicity, a fourth column may exist in the table for graph data for RDF quads.

The example table 110 in this figure shows that a given subject (e.g., Subj_1) may be associated with numerous RDF triples, each having a distinct combination of a predicate and object/value. Each of these RDF triples is represented as a separate row in the table 110. For example, a first row represents <Subj_1, P_1, Value_1>, a second row represents <Subj_1, P_2, Value_2>, a third row represents <Subj_1, P_3, Value_3>, and a fourth row represents <Subj_1, P_4, Value_4>.

Consider the situation when a query is received at stage (1) that may seek a query result that combines multiple values for a given subject into a single result row. Interactions typically occur with a database by submission of commands that cause the database to perform operations on database data 106A. For RDF data, the type of query that is typically used is a "SPARQL" query. The term SPARQL refers to a protocol using RDF that is designed as a language for querying and manipulating RDF data. SPARQL became an official World Wide Web Consortium (W3C) recommendation in 2008. Database engines that process queries written in SPARQL are able to retrieve and manipulate data stored in the resource description framework format. SPARQL includes constructions for specifying a query that includes "triple" patterns that are processed against conjunctions, disjunctions, etc.

For the database server to process the commands, the commands typically conform to a database language supported by the database server. An example of a commonly used database language supported by many relational database servers is known as the Structured Query Language (SQL). Thus, for an incoming query that is in the SPARQL format, that query when posed to a relational database may be converted by a query rewrite module 120 into a corresponding SQL query at stage (2). Since the RDF data in this example is stored in the RDF table 110, the rewritten query in the SQL format will specifically reference the RDF table 110 in the body of the query.

When a database server receives the database query, the database server must first determine which actions should be performed in response to the query, and then perform those actions. A query processor may process the database statement to prepare the acts necessary for performance of the desired actions within the database. The initial action to analyze and break the database statement into its constituent parts may be referred to as "parsing" the database command. "Compilation" of the database command may then be performed to create the specific composition and sequence of actions to take against delineated set(s) of database objects, as well as code generation that may be necessary to create an executable version of the database statement. Since there may be multiple alternative processing paths that can be taken to achieve the same result within a database, "optimization" may be performed to identify specific processing paths that can be selected to improve the efficiency of processing for the database command. The actual performance of the actions applied to the database is generally referred to as "executing" the database command.

In the current situation, the SQL query generated at stage (2) will be compiled, optimized, and then executed against the RDF table 110. The problem is that certain types of SQL queries against the RDF table 110 that seek to obtain information about the objects/values for a given subject may lead to a need to perform an excessive number of self-joins on that table to put those atomic facts together. For example, if the SQL query is seeking query results 108 that combines object values for multiple predicates for a given subject (Subj_1), then at stage (3), multiple self-joins may need to be performed against the table 110 to process the SQL query to obtain the query result 108. The multiple self-joins are performed to join the information/columns from all of the pertinent rows in table 110 for the multiple RDF triples/quads that are represented in the RDF table for the subject being queried. Thus, there is a potentially high count of self-joins that may need to be performed, which can cause query performance problems and/or inefficiencies.

At stage (4), the query results 108 are thereafter generated based upon performing the multiple self-joins for the RDF table, and at stage (5), the results are provided to the user.

Figure 1B:
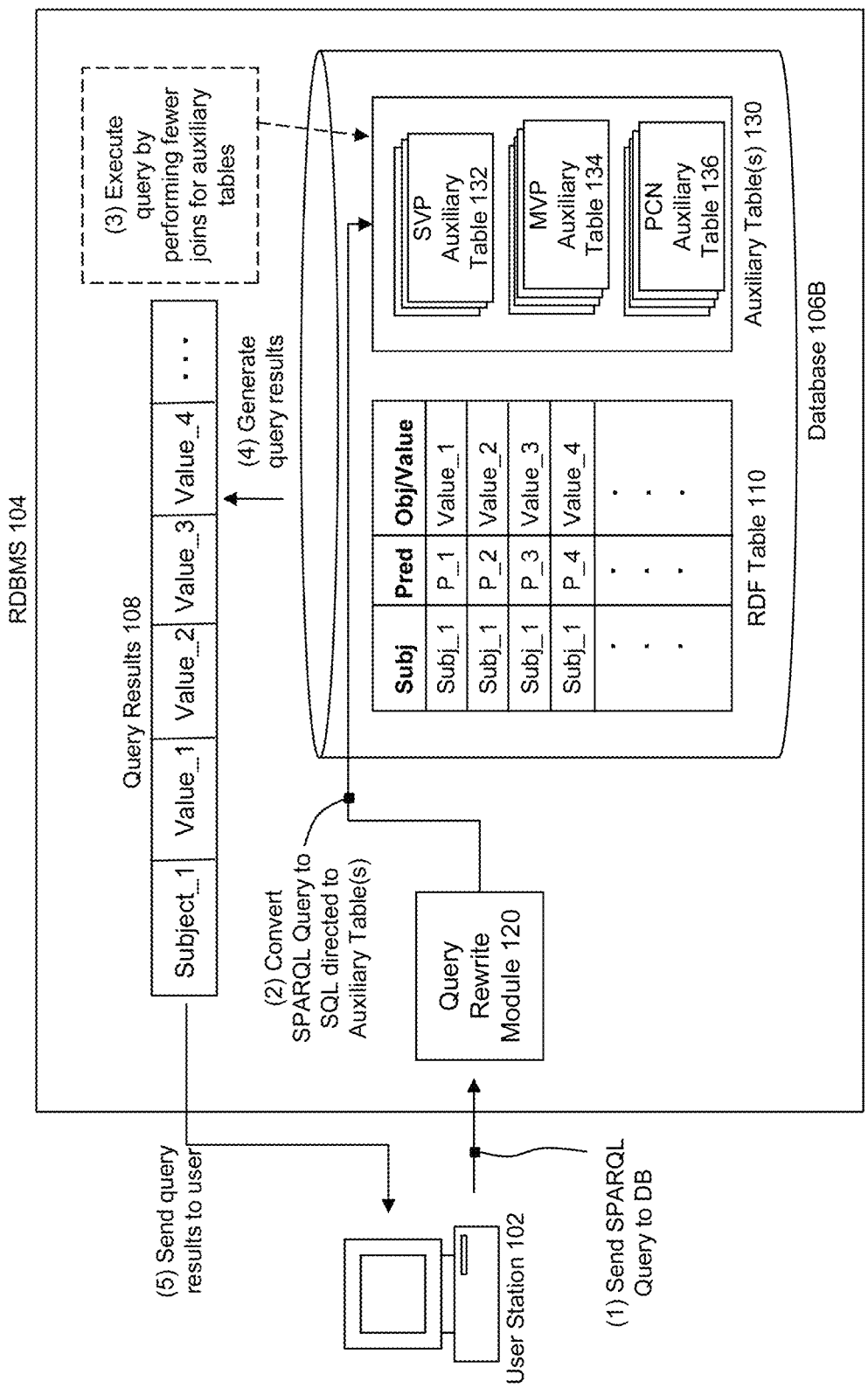
FIG. 1B illustrates RDF data represented with auxiliary tables.

FIG. 1B provides an illustration of an approach to use one or more auxiliary predicate tables to solve the problems identified above, where the auxiliary predicate tables serve to reduce the number of self-joins that potentially need to be performed to process a query. The general idea is that the auxiliary predicate tables will pre-combine certain types of information from the base RDF table 110 into focused auxiliary tables that can reduce the computational expense to process a query. For example, in certain cases, the values from multiple rows of the base RDF table can be combined into a single row in an auxiliary table such that certain types of queries that otherwise would require a self-join in the base table may not need that self-join from the auxiliary table which already has the combined information within a single row. In addition, by having focused auxiliary tables with much less rows as compared to the base RDF table, this means that query processing may become more efficient when targeted to the auxiliary tables.

The illustrative embodiment shown in FIG. 1B include three types of auxiliary tables, including single value predicate (SVP) auxiliary table(s) 132, multi-value predicate (MVP) auxiliary table(s) 134, and predicate-chain (PCN) auxiliary table(s) 136. Each of these auxiliary table types is described in more detail below. It is noted, however, that other types of auxiliary table types are within the inventive scope of this disclosure, and thus the invention is not to be limited just these specific table type unless expressly claimed as such.

The SVP auxiliary table 132 is formed by identifying predicates that correspond to at most a single value, and creating an auxiliary table where the value for each of these identified/desired single value predicates are placed into a separate column within the auxiliary table. For example, each person is typically associated with only a single social security number or birthday. This means that a predicate associated with either social security number or birthday likely corresponds to single value predicates, and thus may be placed as a separate column for a subject within an SVP auxiliary table.

The SVP auxiliary table is very useful when querying against star-pattern sets. To explain, consider a star-pattern-set of size n where all patterns must be associated with the same named-graph denoted by ?g: GRAPH ?g {?x: P1 ?y1. ?x:P2 ?y2 . . . ?x:Pn ?yn}. One can also assume that each of the constant predicates namely, :P1 thru:Pn, is a single-valued predicate that has at most one value for any given subject in the RDF dataset. Processing these patterns against a 4-column <S, P, O, G> table would involve an n-way self-join.

However, if an auxiliary table with columns <S, G1, P1, G2, P2, . . . , Gn, Pn>, storing in each row the G and O values for each of the n predicates from the corresponding <S, P, O, G> quads for a given subject, is available for use, no joins would be necessary and hence query performance would improve significantly. Even if the table included G and P columns for only some, say m, of the n constant predicates, the number of joins would be reduced by (m−1) and that would speed up the query execution.

This present disclosure therefore provides for one or more of the SVP table, where each SVP table stores the data for a star-pattern-set. As described in more detail below, the SVP table is an auxiliary table that is kept fully up to date even when DMLs (data manipulation language operations) are performed against the <S, P, O, G> table.

It is noted that in some embodiments, it is possible that some of the P columns in the SVP table may have NULL values. There are many benefits to having an SVP table where there is a restriction that for a predicate to be included in an SVP table it must be single-valued. For example, this means that the total number of rows in an SVP table cannot exceed the number of distinct S present in the <S, P, O, G> table. In addition, there is no need to use DISTINCT even when accessing only the subject (S) and a subset of the predicates included in an SVP table because no two rows can have the same subject (S).

The multi-value predicate (MVP) table 134 is used to hold predicate values where the subject may have multiple values for a given predicate. An MVP table may include columns <S, G, P> where P corresponds to a constant-predicate, which could be multi-valued. That is, for a given subject, it may have multiple values. For example, a given subject (e.g., a person) may have multiple acquaintances or people that the subject knows, e.g., where an example of such a predicate would be :knows, because any given person may know 0 or more people.

Consider the simple pattern GRAPH ?g {?x:knows ?y}. If one or more MVP tables are created corresponding to a <S, G, P> table with P corresponding to :knows, then query processing with such MVP tables can be performed more efficiently and/or faster due to use of a much smaller table (and smaller indexes) than in the case of using the base <S, P, O, G> table because that table would contain data for all predicates, not just for :knows.

The Predicate-ChaiN (PCN) auxiliary tables 136 are used to hold groups of related predicate values for paths. A set of triples t1, t2, . . . , tn to form a path if for each ti where i>1, the object value of ti−1 is equal to the subject value of ti. A PCN table is based on a user-supplied sequence or list of predicate URIs. Each row in the corresponding PCN table represents a path of triples that match the predicate URI sequence. A path of triples t1, t2, . . . ,tn matches a sequence of predicate URIs p1,p2, . . . ,pn if for each i, the predicate URI of ti is equal to pi.

For example, consider a chain-pattern-sequence of length n (>1) where all patterns must be associated with the same named-graph denoted by ?g: GRAPH ?g {?x :P1 ?v2. ?v2: P2 ?v3 . . . ?vn:Pn ?y}. Processing these patterns against a 4-column <S, P, O, G> table would involve an n-way self-join. The PCN table would include columns <S, G1, P1, G2, P2, Gn, Pn>, storing in each row the G and O values for each of the n predicates from the corresponding <S, P, O, G> quads for the subjects in a chain. This means that no joins would be necessary with this PCN table and hence query performance would improve significantly. Even if the table included G and P columns for only for a sub-chain of length, say m (<n), the number of joins would be reduced by (m−1) and that would speed up the query execution. With embodiments of the invention, one or more PCN (Predicate-ChaiN) tables can be created and maintained, with each storing the data for a chain-pattern-sequence, as an auxiliary table, that is kept up to date even when DMLs are performed against the <S, P, O, G> table. Note that for a predicate to be included in a PCN table in some embodiments, there is no restriction on the cardinality of the predicate. Also, due to inclusion of all the values encountered in a chain, a PCN table will not have any duplicate rows (unless the <S, P, O, G> table itself has duplicates).

In operation, at stage (1), a SPARQL query may be received for processing against the RDF data within the database 106B. With the approach of FIG. 1B, the SPARQL query would be converted to a SQL query that is directed to the auxiliary tables 130 instead of just the base RDF table 110. This means that at stage (3) the SQL query can be processed more efficiently than the approach described above for FIG. 1A. This is because a reduced number of joins and/or self-joins would need to be performed to execute the SQL query. In addition, it is likely that faster and more efficient processing occurs due to the reduced number of rows and index data that need to be accessed to generate the query results. Thereafter, at stage (4), the query results would be produced, which are provided to the user at stage (5).

It is noted that a hybrid mode of operation may be implemented for certain queries, where the SPARQL query is rewritten to a SQL query that operates against both the base RDF table and one or more of the auxiliary tables. This type of query may correspond to the situation where, for example, a first subset of the pertinent predicates for the query correspond to the auxiliary tables while a second subset of the predicates for the query were not placed into the auxiliary tables.

Figure 1C:
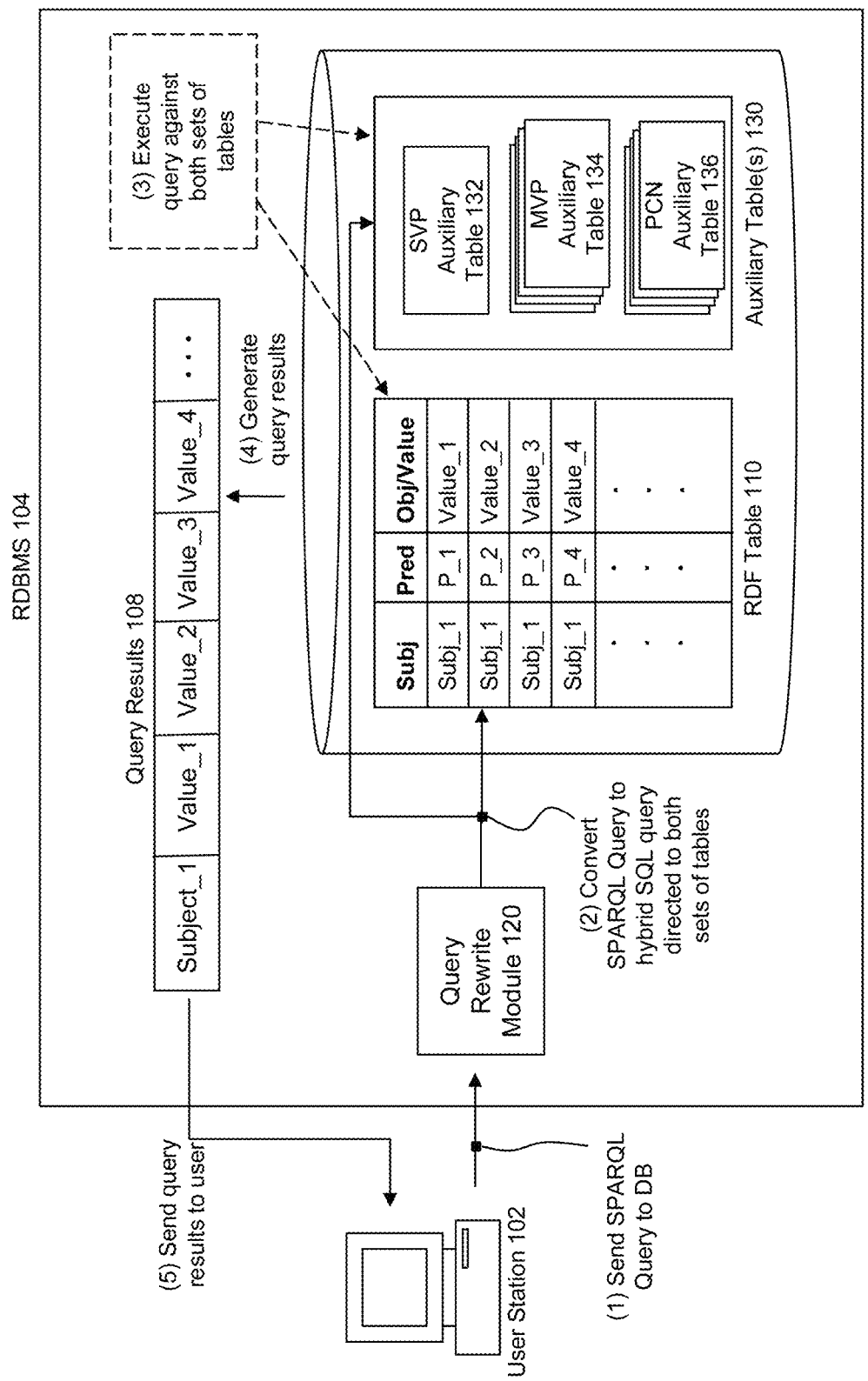
FIG. 1C illustrates RDF data represented with auxiliary tables using a hybrid SQL query conversion.

FIG. 1C provide an illustration of the hybrid approach. Here, at stage (1), the SPARQL query is received and is processed by the query rewrite module 120. However, unlike the previous examples, at stage (2) the SPARQL query is converted into a SQL query that is directed to both the base RDF table 110 and the auxiliary tables 130. At stage (3), this the SQL query would therefore be processed against both sets of tables. As before, execution of the SQL query produces the query result set 108 at stage (4), which is then provided to the user at stage (5).

Figure 2:
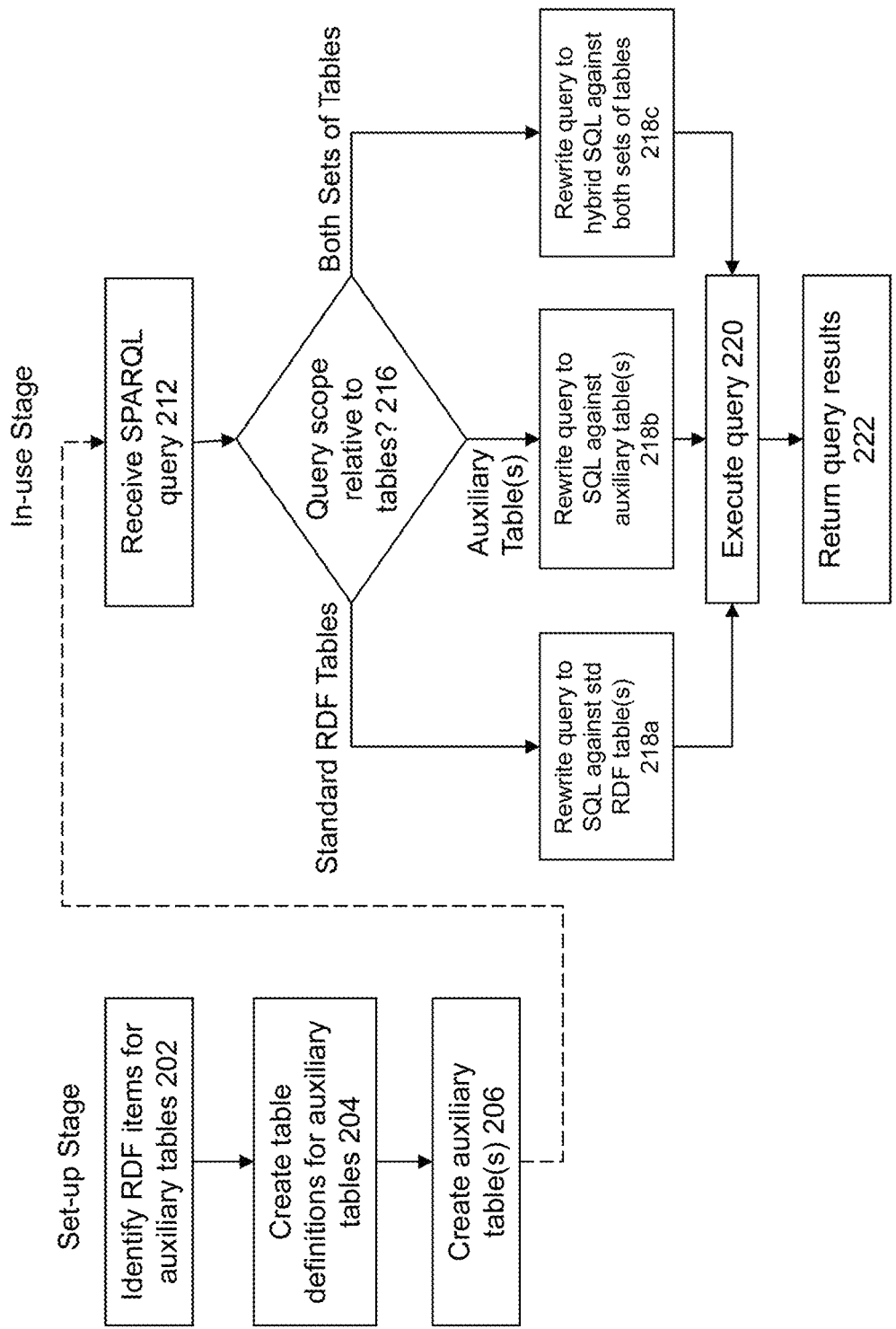
FIG. 2 shows a flowchart of an approach to implement some embodiments of the invention.

FIG. 2 shows a flowchart of an approach to implement some embodiments of the invention. During a set-up stage, at step 202, one or more RDF items may be identified for the auxiliary table(s). In some embodiments, the user is provided with the ability to select the specific predicates that are to be included into the auxiliary table or tables, and the specific combination of predicates to appear in any given auxiliary table. Therefore, the user may choose whether to include a predicate into a table, and which table to include it into. In an alternate embodiment, the database system may automatically identify predicates and/or combinations of predicates that can be placed into one or more auxiliary tables. This may occur, for example, by tracking a history of queries/workloads that are received by the database system along with the predicates that are associated with these historical queries/workloads, and this historical data is used to identify specific predicates that can be placed into auxiliary tables to more efficiently process the same or similar queries that are likely to be received in the future.

Predicate information may be collected to help determine which predicate to insert into which auxiliary table. For example, a predicate information table may be maintained that tracks statistics about some or all of the predicates in a model, e.g., to determine which predicates are single-valued and which predicates are multi-valued. This type of table may track, for example, the system identifier for a predicate, a lexical value for the predicate, the minimum number of distinct values for the predicate, the maximum number of distinct values for the predicate, the median number of distinct values for the predicate, the average number of distinct values a subject resource has for the predicate, the total number of triples that include the predicate, and any hints regarding the appropriate auxiliary table type for the predicate.

At 204, table definitions are created for the desired auxiliary tables. These table definitions may be stored within the data dictionary of the database system. Thereafter, at 206, the auxiliary table are created and populated using data from the base RDF table. The auxiliary table may either include the lexical values for objects, or may include a reference ID or link to an external lexical value table. It is noted that indexes may be created on some or all of the auxiliary tables.

Any suitable approach may be employed to create the auxiliary tables. For example, an SVP table may be created by using a subquery "SELECT DISTINCT (ID values) FROM <RDF Table>" and performing outer joins of that table with tables created by additional subqueries of the form "SELECT*FROM <RDF Table> WHERE . . . " such that the ID values are the same for all the joined rows and the values for certain corresponding columns of the respective rows that are joined together. A more detailed example of this approach is provided below with respect to FIGS. 3B-1 and 3B-2.

During an operational in-use stage, a SPARQL query may be received at step 212. A determination is made at 216 of the scope of SPARQL query relative to the auxiliary tables. In particular, a determination is made of the auxiliary tables that correspond to the predicates associated with the SPARQL query.

If there are no auxiliary tables that correspond to the predicates associated with the SPARQL query, then at step 218a, the SPARQL query is rewritten as a SQL query that is directed to the base RDF table. If there are auxiliary tables that correspond to all of the predicates associated with the SPARQL query, then at step 218b, the SPARQL query is rewritten to a SQL query that is directed to the appropriate auxiliary table(s). If only a partial set of the predicates in the SPARQL query are associated with the auxiliary tables where there are other predicates that do not correspond to at least one auxiliary table, then at step 218c, the SPARQL query is rewritten as a hybrid SQL query that is directed to both the base RDF table and the appropriate auxiliary table(s). The SQL query is then executed at step 220, and the query result set returned at step 222.

Figures 1, 3B:
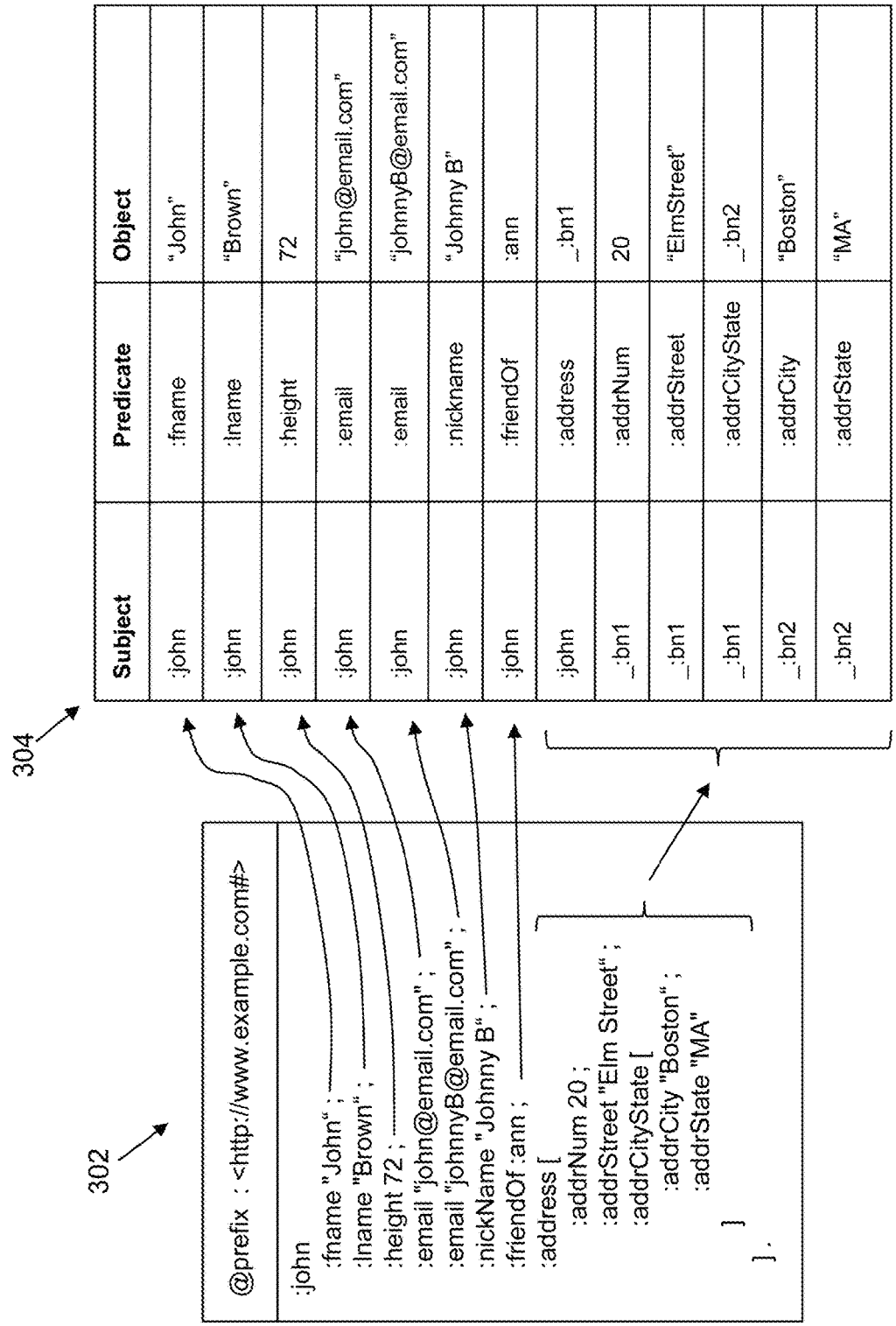
Figures 2, 3B:
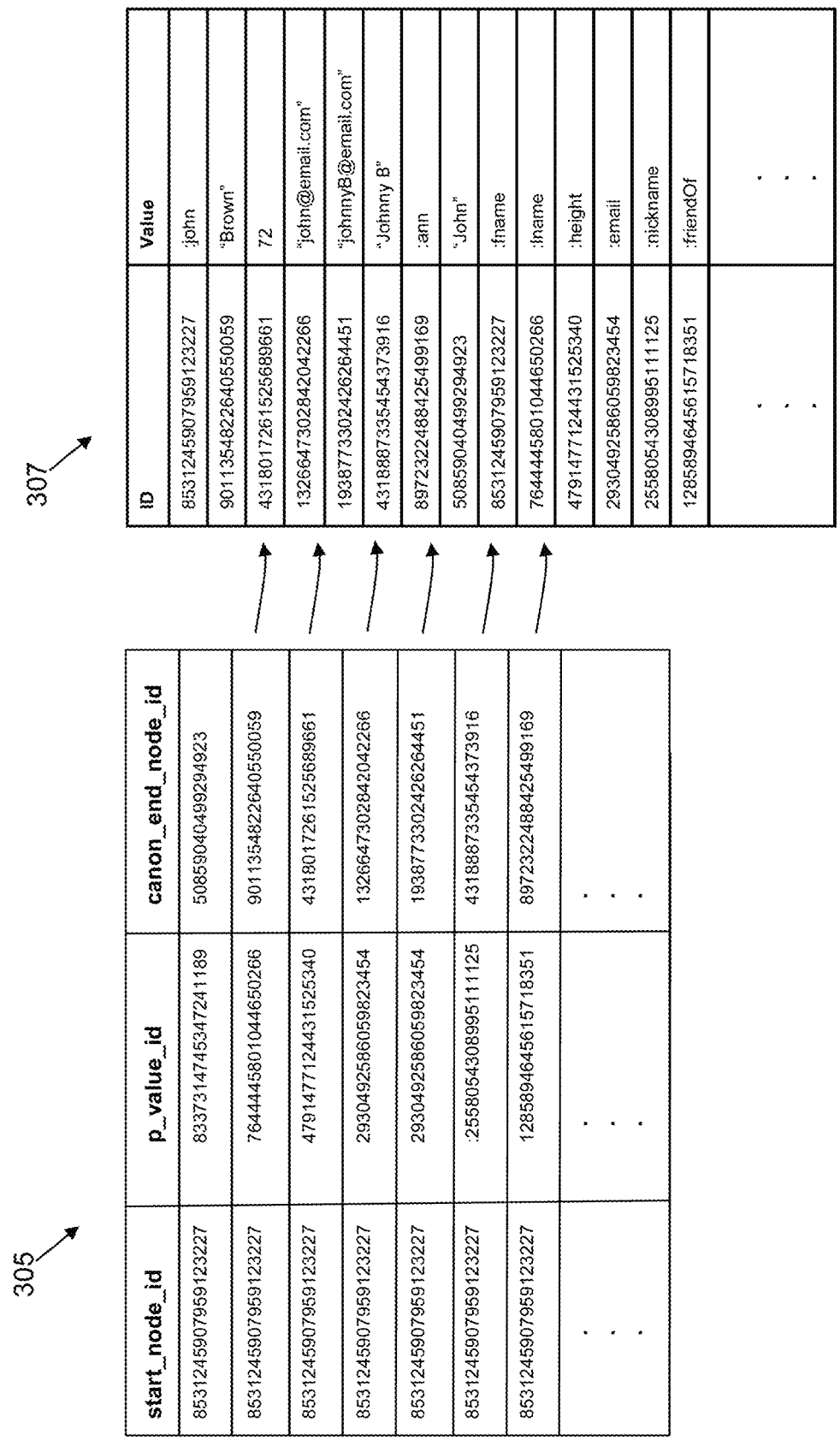

FIGS. 3A-L provide an illustrative example of some embodiments of the invention. FIG. 3A shows example RDF data 302. The RDF data 302 includes multiple items of RDF information for a subject "john". For example, the predicate "fname" corresponds to an object value "John" that is the first name for the subject, while the predicate "lname" corresponds to an object value "Brown" that identifies the last name for the subject. Each other line in the RDF data 302 pertains to a different RDF triple for the subject "john". It is noted that RDF data may be expressed using any suitable syntax within the scope of the invention, e.g., where RDF data is expressed the "Turtle" (Terse RDF Triple Language) serialization syntax.

FIG. 3B-1 shows how the RDF triples within the RDF data 302 may be represented within an RDF table 304. Here, each separate RDF triple is presented as a separate row within the RDF table 304. Each of the three components within an RDF triple is associated with a separate column in the RDF table 304, e.g., a first column for the subject, a second column for the predicate, and the third column for the object.

It is noted that the FIG. 3B-1 shows actual values in each column. However, some implementations of database storage for RDF data may instead use ID or reference values to represent lexical values. As illustrated in FIG. 3B-2 in some embodiments, a relational schema for storing RDF data may include an RDF_LINK$ triples table 305 and one or more RDF_VALUE$ values table 307. The RDF_VALUE$ table stores an ID to lexical value mapping for RDF terms, and the RDF_LINK$ table stores 4-tuples of IDs representing subject(START_NODE_ID), predicate(P_VALUE_ID), object (CANON_END_NODE_ID), and graph(G_ID—not shown in the figure). In some embodiments, each of the start_node_id, p_value_id, canon_end_node_id, and/or g_id items may be represented in respective separate values tables. This approach provides numerous benefits. For example, if the same lexical value (such as "John") exist for many RDF triples, then that same text string does not need to be repetitively stored numerous times within the Links table 305, thereby incurring excessive storage and/or memory costs for the system. Instead, that value may be stored once in the Values table 307, and referenced as many times as necessary using the appropriate ID value in the Links table 305. An example approach to represent RDF data using these types of tables is described in U.S. Pat. No. 9,197,597, which is hereby incorporated by reference in its entirety.

FIG. 3C shows an example SPARQL query 306 that may be directed to the RDF data 302. This example query 306 seeks the object values corresponding to a set of predicates in the "WHERE" clause, including the "fname", "lname", "height", "email", "nickName", "friendOf", and "address/:addrCityState/:addrState" predicates.

If there are no auxiliary tables, then the database system would simply rewrite the SPARQL query 306 to be directed to just the base RDF table 304. FIG. 3D provides an illustration of a possible SQL query 310 that can be created that corresponds to the SPARQL query 306. It can be seen in the "FROM" clause 312 of the SQL query 310 that the SQL only references the base RDF table 304 ("RDF_LINKS"), and the SQL does not reference any auxiliary tables.

Here, because each of the RDF triples being queried exists in a separate row within the same base RDF table, this means that the query 310 would need to perform multiple self-joins to process the multiple rows of data in the same table. For this specific example, as can be seen in the FROM clause 312, a total of eight self-joins will need to be performed to process this query 310.

Figure 3E:
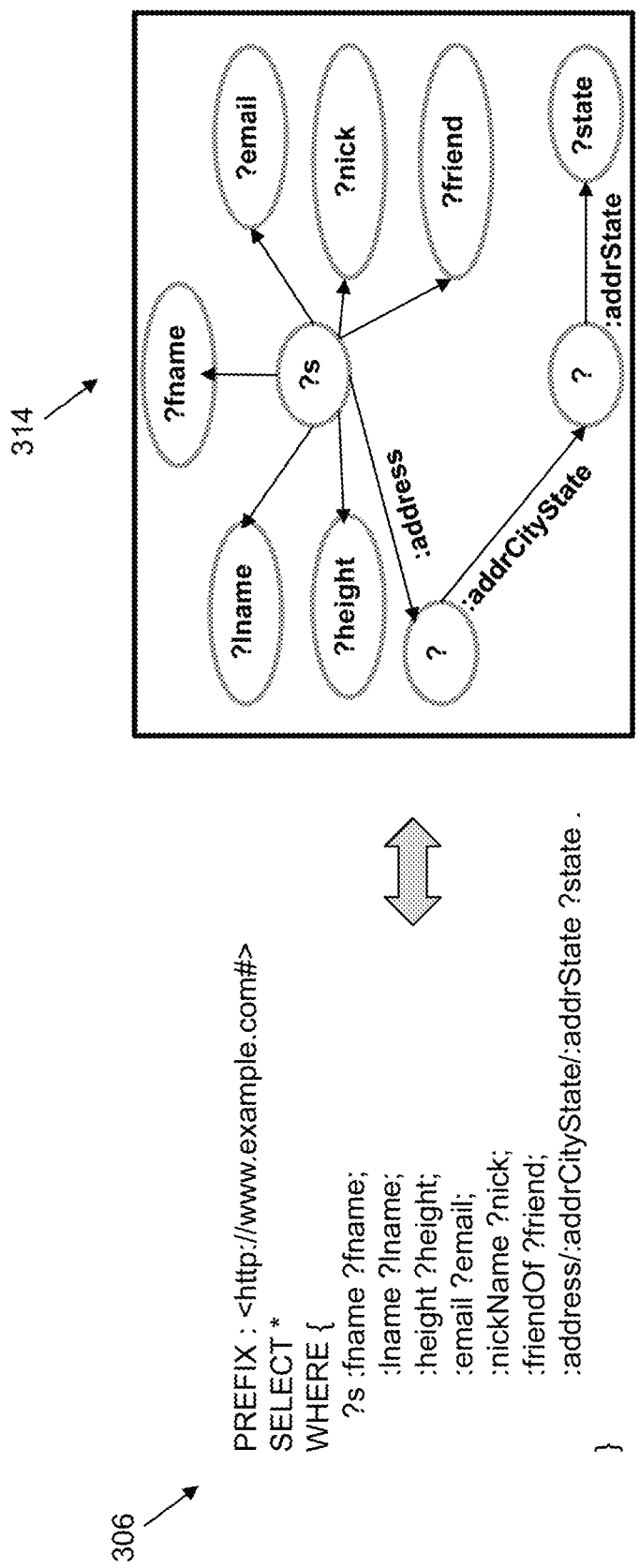

A description will now be provided of how to implement auxiliary tables for this illustrative example to make the query process more efficient. FIG. 3E reproduces the previously-described SPARQL query 306, along with a graph representation 314 of the query. A graph G is traditionally modeled as a pair (V, E), where V is the set of vertices and E is the set of edges. An edge connects a pair of vertices and represents a relationship between the two vertices. A directed edge connects a source vertex to a target vertex. An edge may also have a label that indicates the type of relationship (e.g., worksFor). Vertices may also have properties that are represented as attribute-and-value pairs with possibly varying cardinalities for the attributes. An edge may have properties too, but since it is not essential for this document, we omit any discussion on that aspect. In an RDF graph, a triple of the form <S, P, O> can represent either a directed-edge, labeled P, from vertex S to vertex O, or a property with attribute-and-value pair (P, O) for vertex S. RDF also allows associating a named graph context with a triple to creating a 4-tuple, <S, P, O, G>, corresponding to the RDF quad, where G designates the optional named graph component.

The ability to represent data using these atomic facts—edges and properties—supports tremendous flexibility in data representation and accommodating evolving data. Performance of common queries, however, is negatively affected due to the need for combining large number of such atomic facts together when answering such queries. This is because, as previously noted, the traditional approach of storing RDF triples/quads in a relational table with three/four columns leads to a need for many self-joins on that table to put those atomic facts together when processing some types of queries. The potentially high count of self-joins causes slow query performance and puts stress on the query optimizer's ability to heuristically come up with an optimal execution plan. Therefore, the present embodiment will create SVP, MVP, and/or PCN auxiliary tables to address these problems.

Figure 3F:
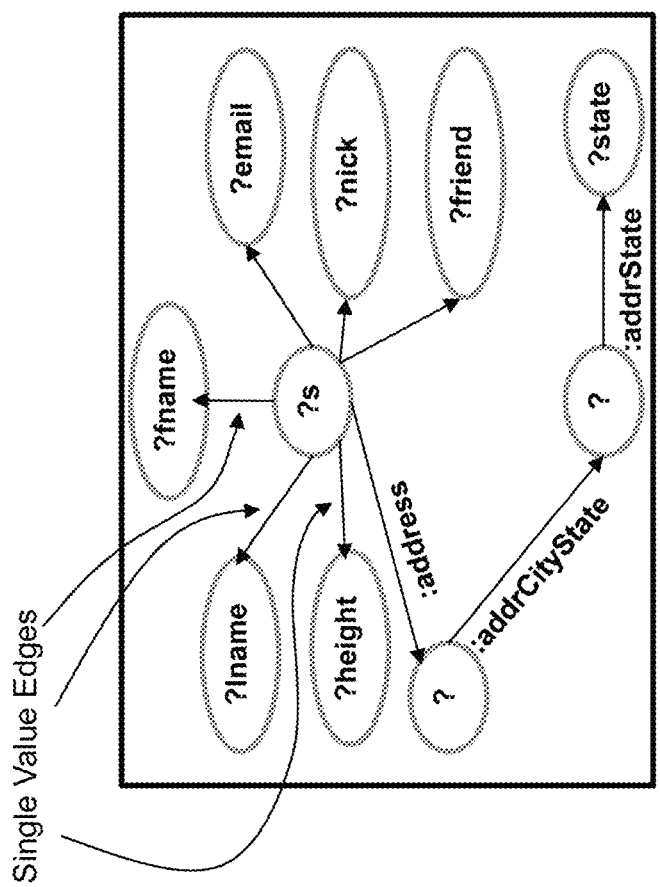

FIG. 3F identifies the single-valued edges within the graph representation. In particular, the "fname", "lname", and "height" predicates are identified as singled-valued predicates. This makes sense, since a given person/subject normally only has a single first name, last name, and height.

Figures 1, 3G:
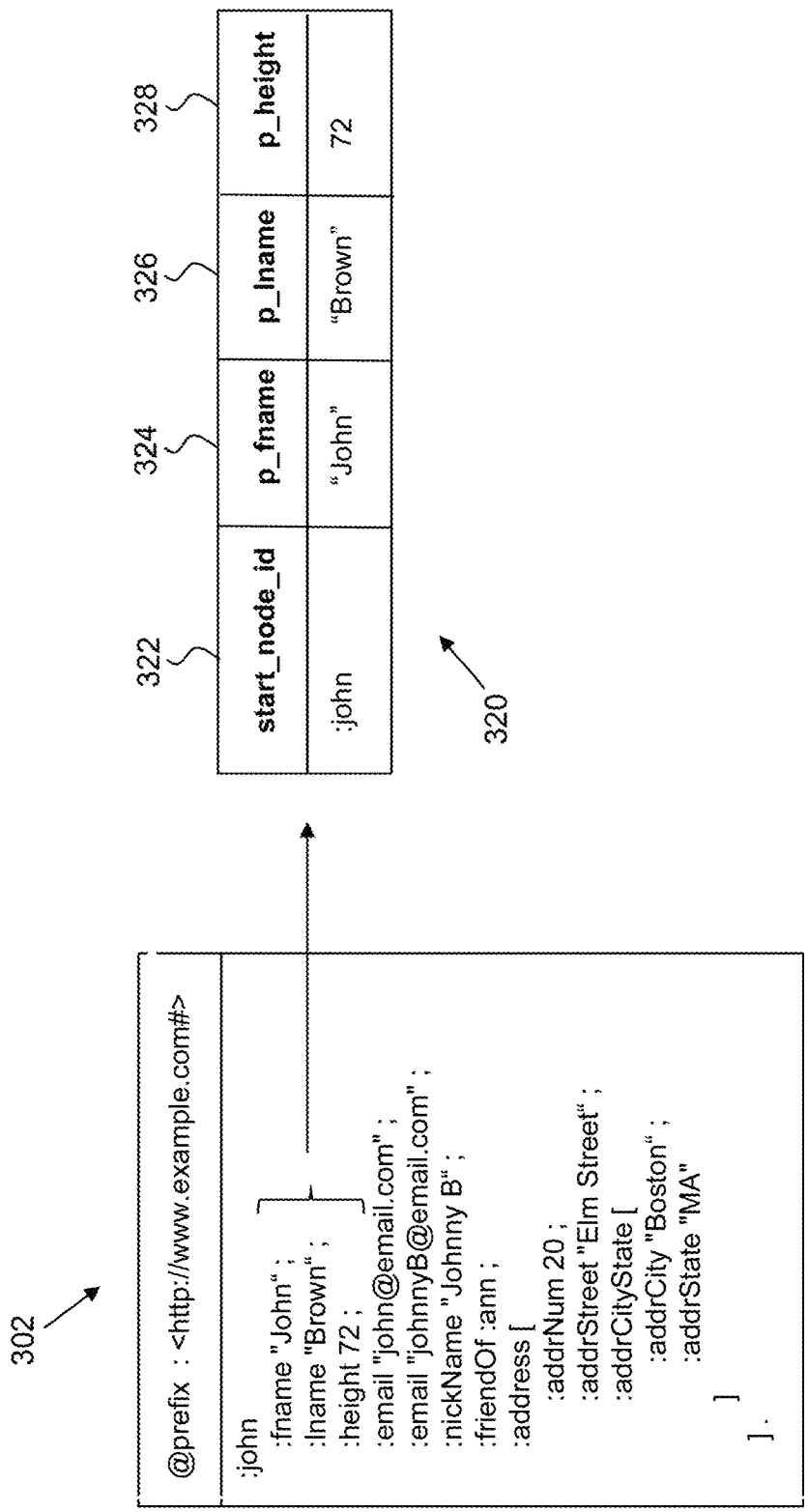

FIG. 3G-1 illustrates how these single-valued predicates in the RDF data 302 can be represented in an SVP table 320. Here, the SVP table 320 includes a separate column for each of the single-valued predicates that are associated with the auxiliary table. In particular, table 320 include a first column 322 that identifies the subject, a second column 324 that identifies an object value for the first name predicate "fname", a third column 326 that identifies an object value for the last name predicate "lname", and a fourth column 328 that identifies an object value for the height predicate "height". Each row in the SVP table includes these objects values for a different subject.

As previously discussed, a query may be constructed to create an auxiliary table. For instance, an SVP table for (single-valued) properties:P1 thru:Pn may be created by starting with the subquery SELECT DISTINCT (START_NODE_ID) FROM <RDF Table> and performing outer joins of that table with tables created by the subqueries of the form SELECT*FROM <RDF Table> WHERE P_VALUE_ID=Id(:Pi), such that the START_NODE_ID values are the same for all the joined rows and the values for the columns P1 thru Pn and G1 thru Gn are obtained from canon_end_node_id and g_id columns of the respective rows that are joined together. If, for a given start_node_id, no rows are present for some of the properties, e.g., :Pi, then the corresponding P and G columns, Pi and Gi, in the joined row for that start_node_id are set to NULL. FIG. 3G-2 shows an example query that may be used to create the SVP table shown in FIG. 3G-1.

Figure 3H:
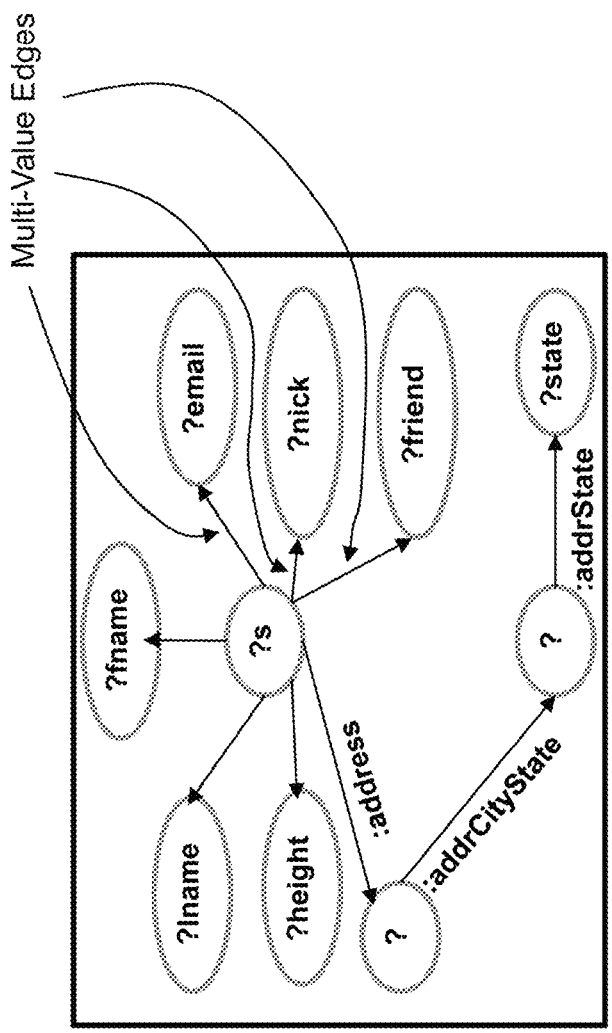
Figure 31:
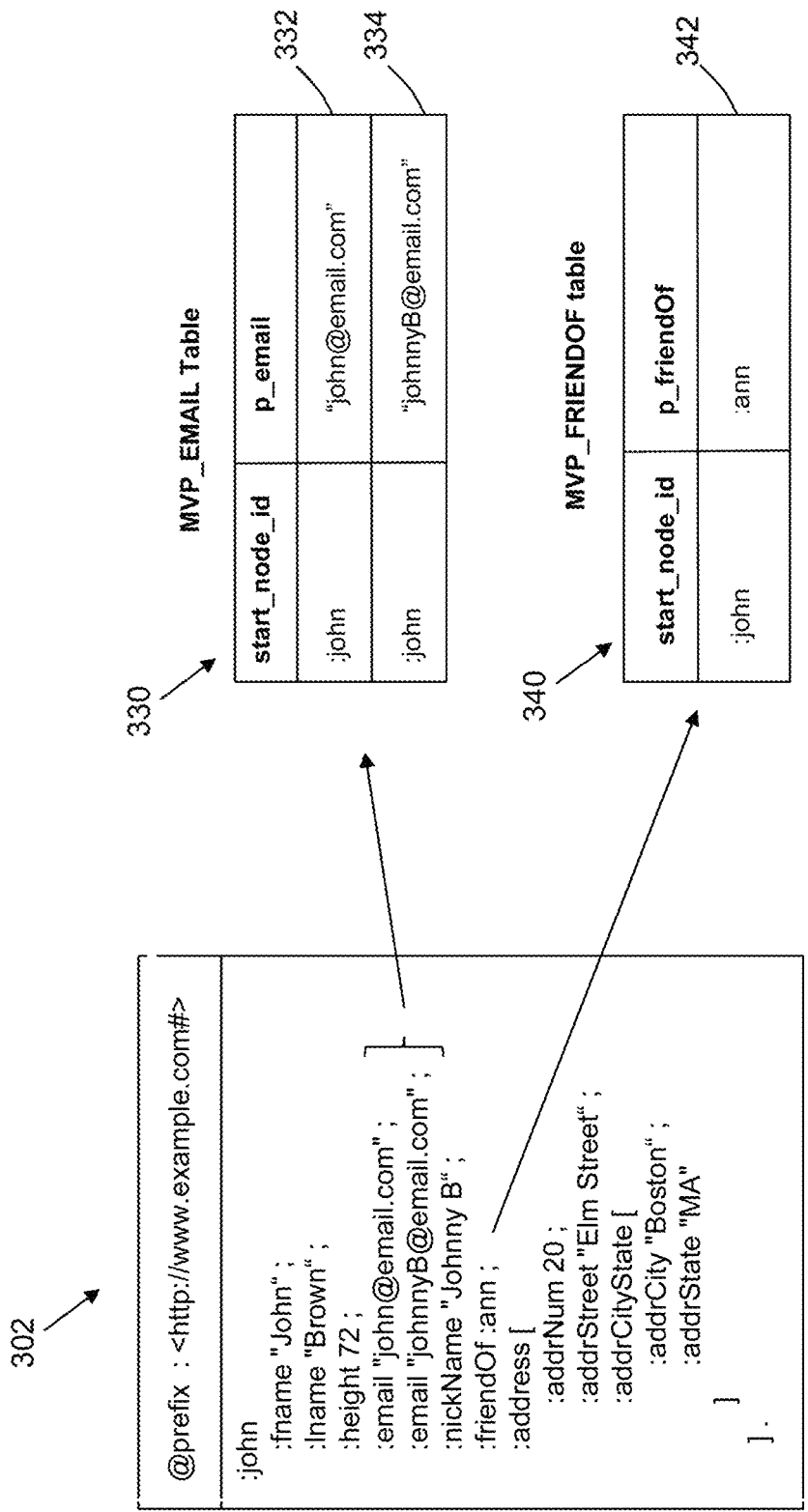

FIG. 3H identifies the multi-valued edges within the graph representation. In particular, the "email", "nick", and "friend" predicates are identified as multi-valued predicates. This makes sense, since a given person/subject can normally be associated with any number of zero or more email addresses, nicknames, or friends.

FIG. 3I illustrates how multi-valued predicates in the RDF data 302 can be represented in one or more MVP tables. Any of the multi-valued predicates can be associated with a separate MVP table, and each row within the MVP table is associated with a separate object value from that predicate.

Here, a first MVP table 330 is created for the multi-valued "email" predicate. This MVP table 330 includes a first column that identifies a subject for a row and a second column that identifies the object value for the email predicate for that subject. For the subject "john", the RDF data 302 identifies RDF triples associated with the email predicate, meaning that the subject "john" is associated with two different email addresses. Each of these RDF triples with their different email addresses is stored in separate rows in the email MVP table 330, with the first email address for "john" stored in row 332 and the second email address stored in row 334.

A second MVP table 340 is created for the multi-valued "friendOf" predicate. This MVP table 340 includes a first column that identifies a subject for a row and a second column that identifies the object value for the friendOf predicate for that subject. For the subject "john", the RDF data 302 identifies an RDF triple associated with the friendOf predicate having an object value "ann", meaning that the subject "john" is associated with a friend called "ann". Even though only a single RDF triple for this predicate exists for john, this is nonetheless a multi-valued predicate since it is possible for john to be associated with multiple RDF triples for this predicate (and indeed there are likely other subjects having multiple triples for this predicate). Therefore, the MVP table 340 is created for this predicate, and the row 342 is populated with the RDF triple for subject "john" in a first column and the object value "ann" for this predicate in a second column.

It is noted that although the predicate "nickname" is a multi-valued predicate represented in the RDF data 302, an MVP auxiliary table was not created for this predicate. This highlights the idea that it is controllable whether or not it is desired to create an auxiliary table for any given predicate in the RDF data.

Figure 3J:
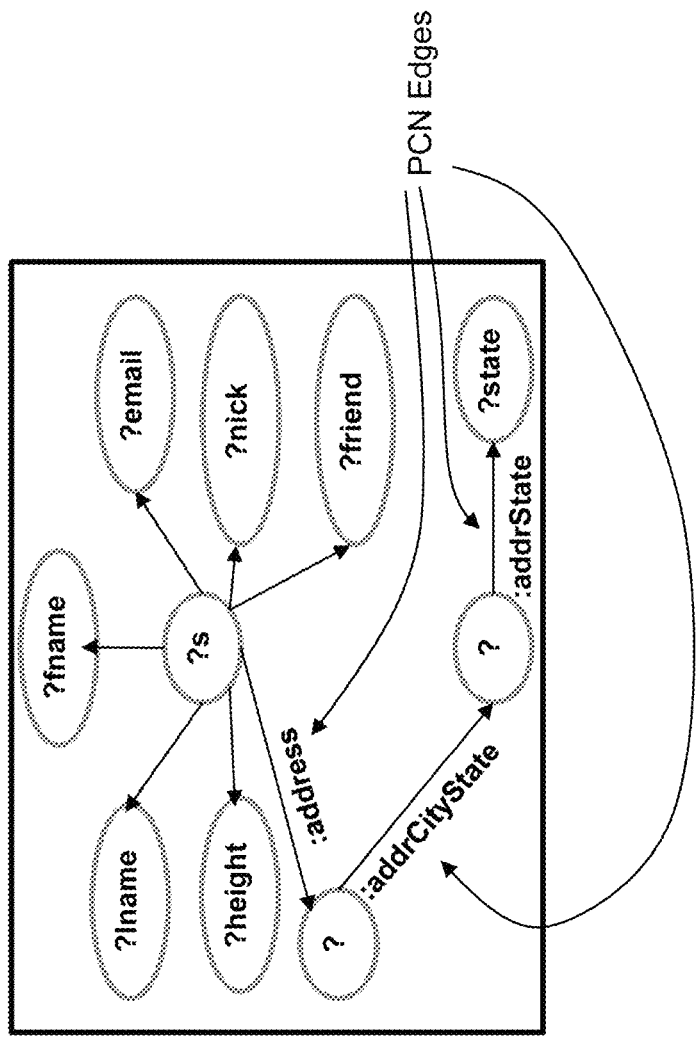

FIG. 3J identifies the predicate-chain edges within the graph representation. In particular, the "address", "addrCityState", and "addrState" predicates are identified as multi-valued predicates.

Figure 3K:
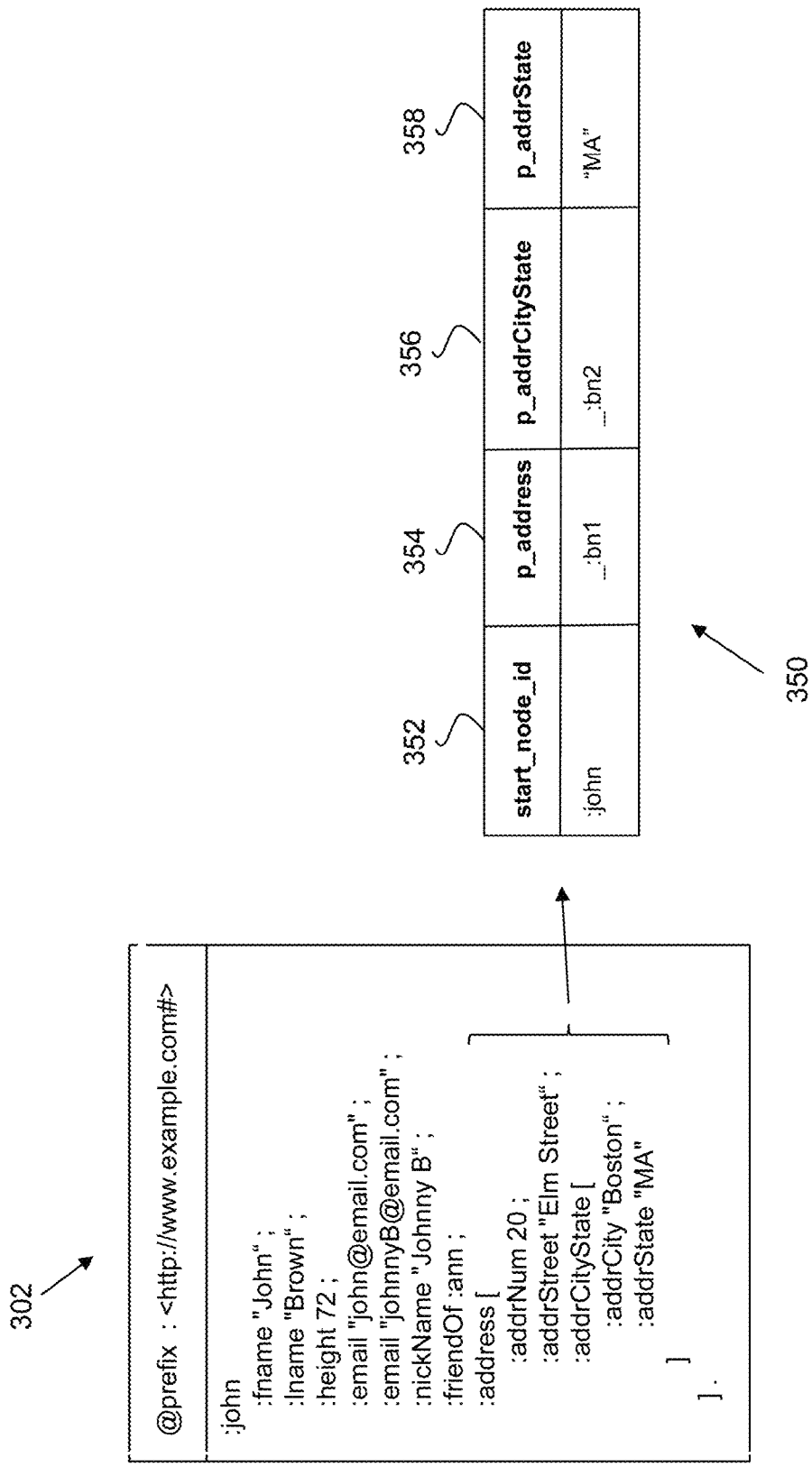

FIG. 3K illustrates how these multi-valued predicates in the RDF data 302 can be represented in one or more PCN tables. Here, the PCN table 350 includes a separate column for certain predicate-chain elements that are associated with the auxiliary table. In particular, table 350 include a first column 352 that identifies the subject, a second column 354 that identifies an object value for the chained-predicate "address", a third column 356 that identifies an object value for the chained-predicate "addrCityState", and a fourth column 358 that identifies an object value for the chained-predicate "addrState". Each row in the PCN table includes these objects values for a different subject.

FIG. 3L shows how the SPARQL query 306 can be rewritten into a SQL query that accesses the auxiliary tables. Here, the FROM clause 362 in SQL query 360 refers to the SVP, MVP, and PCN auxiliary tables. It is noted that this is a hybrid query since the FROM clause 362 also identifies the base RDF table (RDF_LINK$").

In its execution, this SQL query 360 will need to perform much fewer joins as compared to the SQL query 310 that is directed to just the base RDF table. In particular, while the previous SQL query 310 that is directed to just the base RDF table will likely need to perform eight self-joins, the new SQL query 360 will need to perform just four joins, which has cut the number of joins in half.

As previously discussed, a SPARQL query is transformed into a SQL query that is directed to either the original RDF table, the auxiliary table(s), or a hybrid query against both types of tables. An illustrative relational schema for storing RDF data may include an RDF_LINK$ triples table and an RDF_VALUE$ values table. The RDF_VALUE$ table stores an ID to lexical value mapping for RDF terms, and the RDF_LINK$ table stores 4-tuples of IDs representing subject(START_NODE_ID), predicate(P_VALUE_ID), object (CANON_END_NODE_ID), and graph(G_ID).

A SPARQL query can be translated to an equivalent SQL query against the RDF_LINK$/RDF_VALUE$ relational schema. A reference to RDF_LINK$ is added to the SQL FROM clause for each triple pattern in the SPARQL query, and join conditions between those RDF_LINK$ references are added based on variables in the triple patterns. If two triple patterns share a common variable, then the RDF_LINK$ columns corresponding to the position of those common variables must be equal. For example, t1.start_node_id=t2.start_node_id should be added to the SQL WHERE clause if the first and second triple patterns have a common subject variable. A data structure such as a hash map or graph can be used to track dependencies and generate join conditions between triple patterns. In addition, equality conditions can be added to the WHERE clause for any constant subject, predicate, object or graph in a triple pattern. For example, t1.canon_endnode_id=<id_forconstant_object> should be added if the first triple pattern has a constant in the object position. Other SQL operations are used for more complex SPARQL constructs, for example OUTER JOIN for SPARQL OPTIONAL. In addition, joins with RDF_VALUES are added to retrieve lexical values that need to be returned from the query or are used to evaluate a SPARQL FILTER expression. SPARQL FILTER expressions, which consist of numeric expressions, comparisons, string functions, etc., are straightforward to translate to equivalent SQL expressions that are added to the SQL WHERE clause.

SVP, MVP, and PCN auxiliary tables can be used in the SPARQL to SQL translation. If n triple patterns with constant values in the predicate position are joined based on a common subject variable, then those n references to RDF_LINK$ in the FROM clause can be replaced with a single reference to an SVP table S1 that covers those n predicates. The subject-based joins for those n triple patterns are no longer needed because the SVP table implicitly captures those joins, and S1.START_NODE_ID, S1.G<PREDICATE_ID>, S1.P<PREDICATE_ID> can be used in place of START_NODE_ID, GRAPH_ID and CANON_END_NODE_ID columns of the original RDF_LINK$ table reference. Any RDF_LINK$ reference for a triple pattern with a constant predicate can be replaced with a reference to an MVP table M1 for that predicate along with corresponding column substitutions M1.START_NODE_ID, M1.G<PREDICATE_ID>, M1.P<PREDICATE_ ID> for START_NODE_ID, G_ID and CANON_END_NODE_ID respectively. RDF_LINK$ references in the WHERE clause for a sequence of triple patterns with constant predicates t1, t2, . . . , tn joined by ti-1.CANON_END_NODE_ID=ti.START_NODE_ID can be replaced with a single reference to a PCN table P1 covering that sequence of predicates along with corresponding column substitutions P1.START_NODE_ID for t1.START_NODE_ID, P1.G<PREDICATE_ID i> for tiG_ID, and P1.P<PREDICATE_ID i> for ti.CANON_END_NODE_ID and ti+1.START_NODE_ID. Join conditions for ti.canon_end_node_id=ti+1.start_node_id are no longer needed because those joins are implicitly captured by the PCN table P1. In all cases (SVP, MVP and PCN), equality conditions for constant predicates are no longer needed because predicate information is captured by the auxiliary table column names.

Some embodiments of the invention provide an approach to implement automatic maintenance of the auxiliary tables when changes occur to the base RDF table that contain the RDF triples/quads.

Some embodiments are directed to techniques for efficiently reducing the number of SVP tables. To explain this approach, consider that if queries access different sets of predicates, then two possible ways to implement SVP tables could include: (1) create a plurality of different (and smaller) SVP tables with different combinations of predicates; or (2) create a single large SVP table that contains all the predicate properties. The approach of creating a number of SVP tables may require more storage and maintenance overhead as compared to the approach of using a single large SVP table. On the other hand, creating a single SVP table may cause query performance to suffer as compared to the multiple SVP table approach because unnecessary properties not pertinent to a given query may need to be scanned in the row of the single large SVP table to access needed properties for the query.

To resolve these issues, some embodiments create a single SVP table (or alternatively a smaller number of such tables) with a columnar format so that only needed properties are accessed, and the extra storage and maintenance overhead are not needed. With a columnar format, data for a given entry would be stored in columns rather than rows. For example, if Q1 accesses (P2, P5, P6), Q2 accesses (P1, P6), and Q3 accesses (P3, P4), this approach can create a single SVP table with columns (P1,P2,P3,P4,P5,P6), but with columnar format for these properties. When Q1 executes, there is no need to scan P1, P3, and P4. Instead, the database can directly access P2,P5,P6 and process the query. The same also applied to Q2. In contrast, if the database system uses the row format SVP table, then there would be the need to scan P2,P3,P4,P5 to access P6, which will degrade the performance.

The columnar format SVP table may be materialized only on an in-memory basis so that all DMLs are executed against the base RDF table, where the in-memory columnar format SVP table is automatically synced with the base RDF table.

Figure 4:
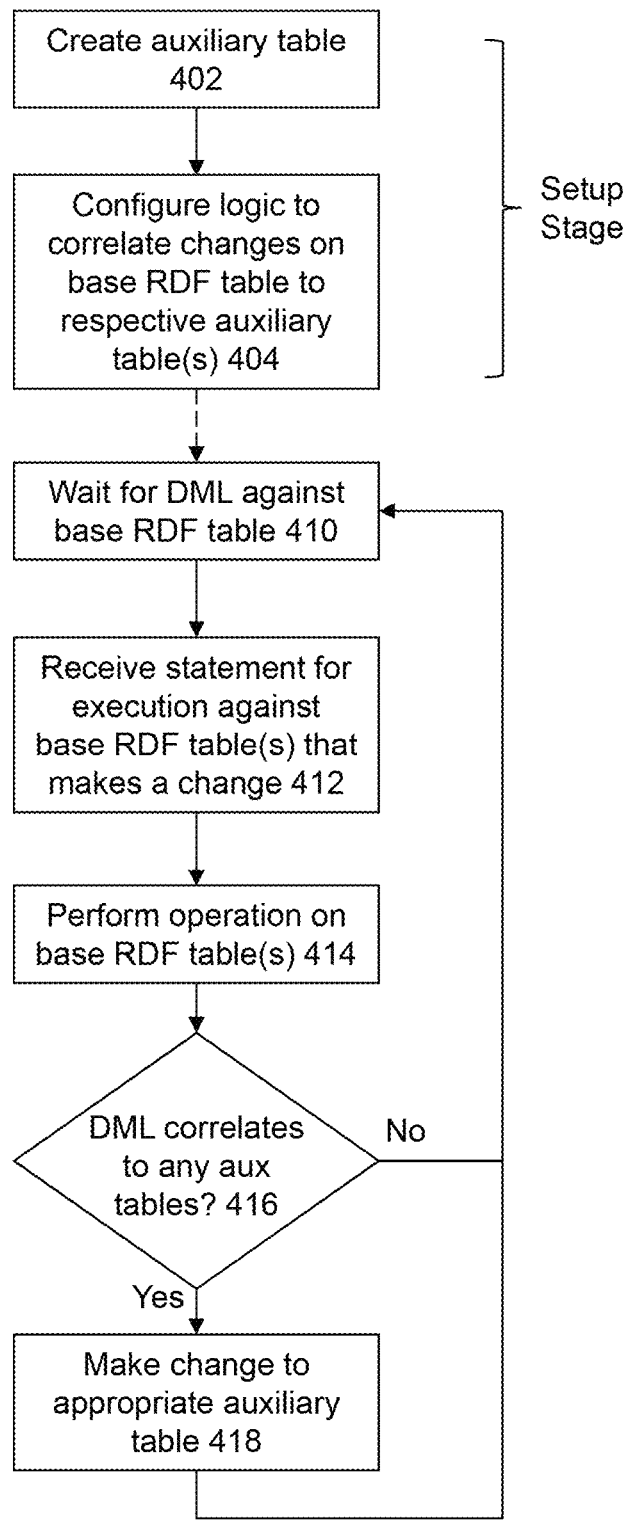
FIG. 4 shows a flowchart of an approach to implement automatic maintenance of the auxiliary tables according to some embodiments of the invention.

FIG. 4 shows a flowchart of an approach to implement automatic maintenance of the auxiliary tables according to some embodiments of the invention. At 402, one or more auxiliary tables are created, e.g., using the approach described above.

At 404, logic is configured to correlate changes made to the base RDF table to any corresponding auxiliary tables. This is implemented in some embodiments by using one or more triggers on the base table. A trigger in a database context refers to procedures that are defined that are executed upon the occurrence of a designated condition for an associated table. For example, the trigger can be defined to execute when an INSERT, UPDATE, or DELETE operation is performed on a table. If a trigger already exists for the RDF table, then step 404 will configure the existing trigger to synchronously implement any changes at the RDF table to a corresponding auxiliary table. This is implemented, for example, by having an update trigger, insert trigger, or delete trigger to be fired when a DML statement is executed against the RDF table for any triple associated with a predicate is that also maintained in an auxiliary table, where the same change made at the RDF table is duplicated at the auxiliary table. If the trigger does not already exist on the RDF table, then step 404 will create a new trigger and configure the new trigger as discussed above.

A trigger typically includes a triggering event, a triggering restriction, and a trigger action. For the current embodiment, the trigger statement pertains to a DML operation (e.g., INSERT, UPDATE, or DELETE) that occurs to an RDF triple corresponding to a specific predicate. The trigger action pertains to a replication of the result of that DML change to a corresponding auxiliary table for that predicate. The trigger restriction provides one or more conditions under which the trigger is operated (e.g., the trigger operates under a "WHEN" condition for the existence of the auxiliary table).

At step 410, the database will wait for the occurrence of DML that operates against the RDF table. At 412, a statement may be received for execution against the RDF table. The statement may include one or more DML operations. At 414, the DML operation is performed on the RDF table to make the requested insert, delete, or change one or more RDF triples/quads that are represented in the RDF table.

At 416, a determination is made whether the scope of the DML operation affects the contents of any auxiliary tables. As noted above, this can be determined by applying the conditions built into the trigger that is configured with respect to the auxiliary tables. If the trigger condition is met, then at 418, the trigger action will make an equivalent DML operation to the appropriate auxiliary table(s). The process then proceeds back to 410 to wait for an additional DML operation.

It is noted that the above-described approach to implement automatic maintenance operations for the auxiliary tables may be disabled in certain circumstances. For example, consider bulk operations performed on the base RDF tables which may introduce a large number of changes at the same time to the base RDF table. In this situation, it may not be computationally efficient to use the trigger mechanism to make each individual change from the base RDF table to any corresponding auxiliary tables. Instead, an error condition may be noted, where some or all of the auxiliary tables are dropped, and commands later issued to re-build the auxiliary tables after the bulk loading to the RDF table has completed.

Therefore, what has been described is an improved approach to represent RDF data in a database system, where one or more auxiliary tables are maintained for the RDF data. In some embodiments, the auxiliary tables may include SVP table(s), MVP table(s), and/or PCN tables. The auxiliary predicate tables advantageously allow the database system to reduce the number of joins and/or self-joins that potentially need to be performed to process a query. In addition, query processing may generally become more efficient when directed to the auxiliary tables due to reduced rows to be processed by avoiding the larger number of rows in a base RDF table. Some embodiments also provide for automatic maintenance of the auxiliary tables when DML operations are performed at the base RDF table.

System Architecture Overview

Figure 5:
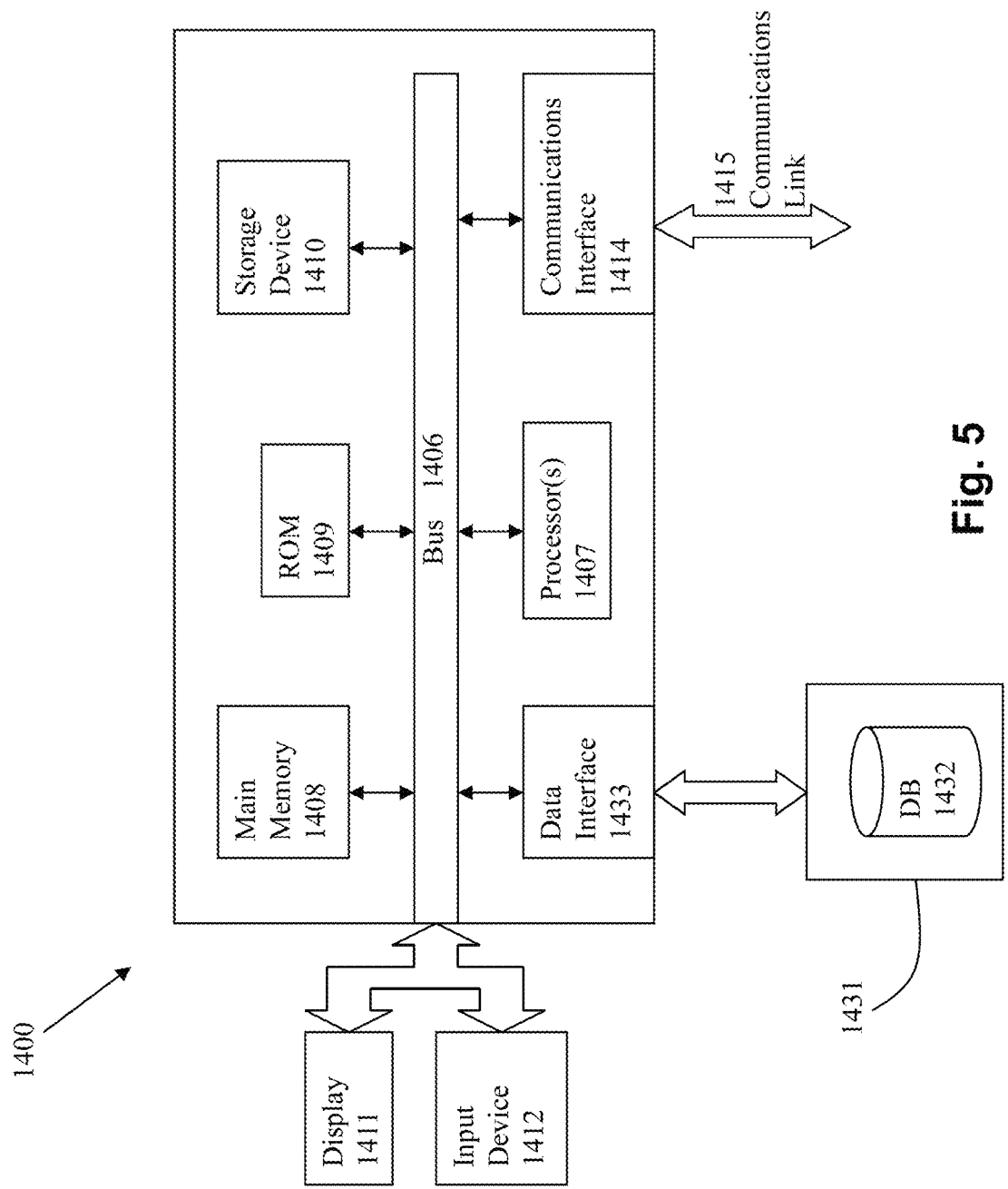
FIG. 5 is a block diagram of an illustrative computing system suitable for implementing an embodiment of the present invention.

FIG. 5 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media.

Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, cloud-based storage, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Data may be accessed from a database 1432 that is maintained in a storage device 1431, which is accessed using data interface 1433.

Figure 6:
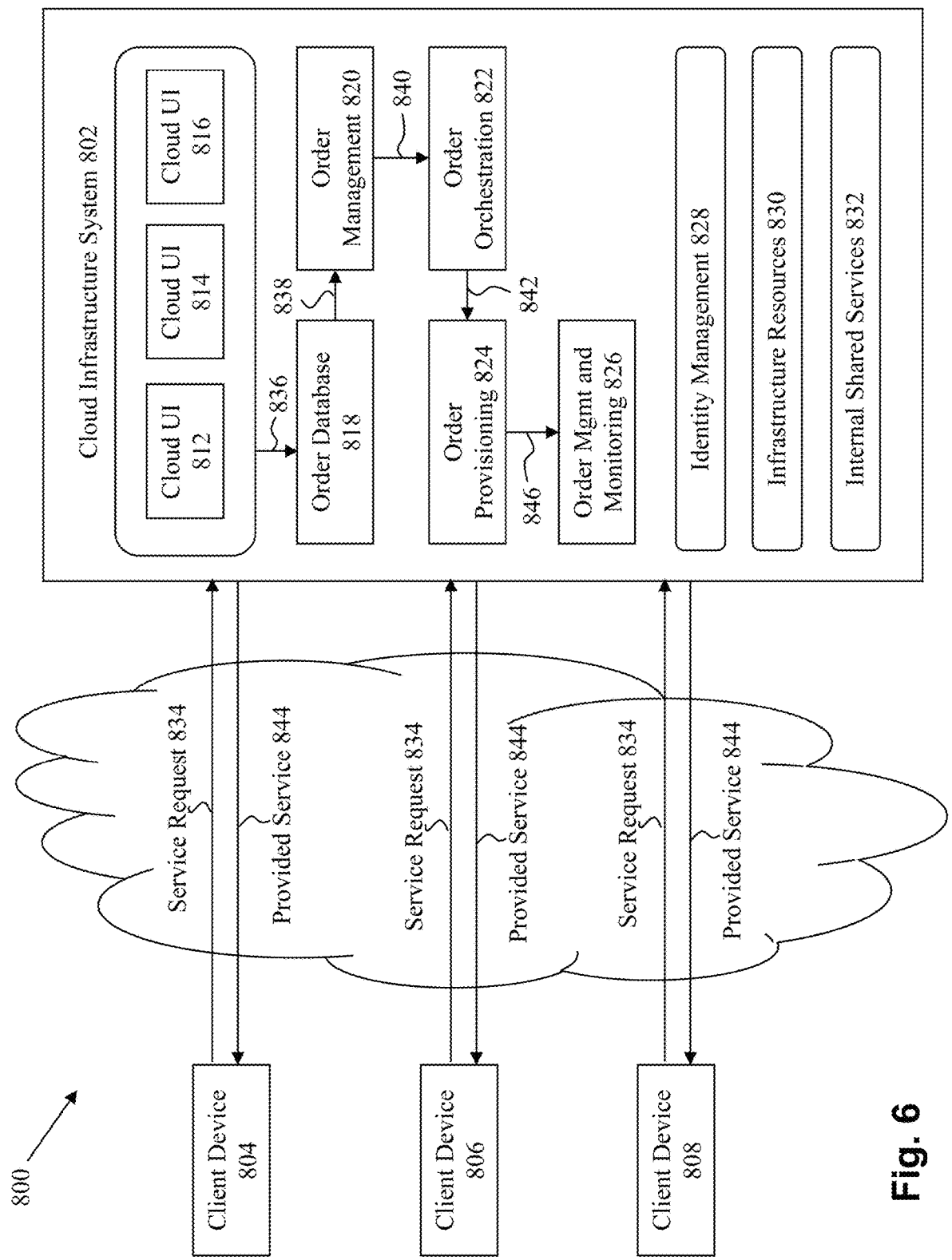
FIG. 6 is a block diagram of one or more components of a system environment in which services may be offered as cloud services, in accordance with an embodiment of the present invention.

FIG. 6 is a simplified block diagram of one or more components of a system environment 800 by which services provided by one or more components of an embodiment system may be offered as cloud services, in accordance with an embodiment of the present disclosure. In the illustrated embodiment, system environment 800 includes one or more client computing devices 804, 806, and 808 that may be used by users to interact with a cloud infrastructure system 802 that provides cloud services. The client computing devices may be configured to operate a client application such as a web browser, a proprietary client application, or some other application, which may be used by a user of the client computing device to interact with cloud infrastructure system 802 to use services provided by cloud infrastructure system 802.

It should be appreciated that cloud infrastructure system 802 depicted in the figure may have other components than those depicted. Further, the embodiment shown in the figure is only one example of a cloud infrastructure system that may incorporate an embodiment of the invention. In some other embodiments, cloud infrastructure system 802 may have more or fewer components than shown in the figure, may combine two or more components, or may have a different configuration or arrangement of components. Client computing devices 804, 806, and 808 may be devices similar to those described above for FIG. 5. Although system environment 800 is shown with three client computing devices, any number of client computing devices may be supported. Other devices such as devices with sensors, etc. may interact with cloud infrastructure system 802.

Network(s) 810 may facilitate communications and exchange of data between clients 804, 806, and 808 and cloud infrastructure system 802. Each network may be any type of network familiar to those skilled in the art that can support data communications using any of a variety of commercially-available protocols. Cloud infrastructure system 802 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 802 may include a suite of applications, middleware, and database service offerings that are delivered to a customer in a self-service, subscription-based, elastically scalable, reliable, highly available, and secure manner.

In various embodiments, cloud infrastructure system 802 may be adapted to automatically provision, manage and track a customer's subscription to services offered by cloud infrastructure system 802. Cloud infrastructure system 802 may provide the cloudservices via different deployment models. For example, services may be provided under a public cloud model in which cloud infrastructure system 802 is owned by an organization selling cloud services and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services, and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloudservices may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 802 may also include infrastructure resources 830 for providing the resources used to provide various services to customers of the cloud infrastructure system. In one embodiment, infrastructure resources 830 may include pre-integrated and optimized combinations of hardware, such as servers, storage, and networking resources to execute the services provided by the PaaS platform and the SaaS platform.

In some embodiments, resources in cloud infrastructure system 802 may be shared by multiple users and dynamically re-allocated per demand. Additionally, resources may be allocated to users in different time zones. For example, cloud infrastructure system 830 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 832 may be provided that are shared by different components or modules of cloud infrastructure system 802 and by the services provided by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 802, and the like.

In one embodiment, as depicted in the figure, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In operation 834, a customer using a client device, such as client device 804, 806 or 808, may interact with cloud infrastructure system 802 by requesting one or more services provided by cloud infrastructure system 802 and placing an order for a subscription for one or more services offered by cloud infrastructure system 802. In certain embodiments, the customer may access a cloud User Interface (UI), cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 that the customer intends to subscribe to.

After an order has been placed by the customer, the order information is received via the cloud UIs, 812, 814 and/or 816. At operation 836, the order is stored in order database 818. Order database 818 can be one of several databases operated by cloud infrastructure system 818 and operated in conjunction with other system elements. At operation 838, the order information is forwarded to an order management module 820. In some instances, order management module 820 may be configured to perform billing and accounting functions related to the order, such as verifying the order, and upon verification, booking the order. At operation 840, information regarding the order is communicated to an order orchestration module 822. Order orchestration module 822 may utilize the order information to orchestrate the provisioning of services and resources for the order placed by the customer. In some instances, order orchestration module 822 may orchestrate the provisioning of resources to support the subscribed services using the services of order provisioning module 824.

In certain embodiments, order orchestration module 822 enables the management of business processes associated with each order and applies business logic to determine whether an order should proceed to provisioning. At operation 842, upon receiving an order for a new subscription, order orchestration module 822 sends a request to order provisioning module 824 to allocate resources and configure those resources needed to fulfill the subscription order. Order provisioning module 824 enables the allocation of resources for the services ordered by the customer. Order provisioning module 824 provides a level of abstraction between the cloud services provided by cloud infrastructure system 802 and the physical implementation layer that is used to provision the resources for providing the requested services. Order orchestration module 822 may thus be isolated from implementation details, such as whether or not services and resources are actually provisioned on the fly or pre-provisioned and only allocated/assigned upon request.

At operation 844, once the services and resources are provisioned, a notification of the provided service may be sent to customers on client devices 804, 806 and/or 808 by order provisioning module 824 of cloud infrastructure system 802.

At operation 846, the customer's subscription order may be managed and tracked by an order management and monitoring module 826. In some instances, order management and monitoring module 826 may be configured to collect usage statistics for the services in the subscription order, such as the amount of storage used, the amount data transferred, the number of users, and the amount of system up time and system down time.

In certain embodiments, cloud infrastructure system 802 may include an identity management module 828. Identity management module 828 may be configured to provide identity services, such as access management and authorization services in cloud infrastructure system 802. In some embodiments, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.) Identity management module 828 may also include the management of descriptive information about each customer and about how and by whom that descriptive information can be accessed and modified.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments.

What is claimed is:

1. A computer implemented method, comprising:
   maintaining an RDF (Resource Description Framework) table in a database, wherein a row in the RDF table corresponds to a separate RDF triple or RDF quad;
   creating an auxiliary predicate table, wherein the auxiliary predicate table corresponds to a predicate in the RDF table;
   receiving a SPARQL query directed to the RDF table;
   rewriting the SPARQL query into a SQL query, wherein the SQL query is directed to at least the auxiliary table; and
   executing the SQL query against at least the auxiliary table to generate a query result.

2. The method of claim 1, wherein the auxiliary predicate table corresponds to at least one of a single-value predicate (SVP) table, multi-value predicate (MVP) table, or predicate-chain (PCN) table.

3. The method of claim 2, wherein the SVP table comprises multiple columns, where a first column in the SVP table corresponds to a first single-value predicate in the RDF table and a second column corresponds to a second single-value predicate in the RDF table.

4. The method of claim 2, wherein the SVP table comprises a columnar format.

5. The method of claim 4, wherein the SQL query is processed against the columnar format of the SVP table by directly accessing a first subset of properties and not scanning a second subset of properties stored in the SVP table.

6. The method of claim 2, wherein the MVP table comprises multiple auxiliary table including a first MVP table for a first multi-value predicate in the RDF table and a second MVP table for a second multi-value predicate in the RDF table.

7. The method of claim 2, wherein the PCN table comprises multiple columns, where a first column in the PCN table corresponds to a first predicate-chain element in the RDF table and a second column corresponds to a second predicate-chain element in the RDF table.

8. The method of claim 1, wherein SQL query is directed to both the auxiliary table and the RDF table.

9. The method of claim 1, further comprising identifying the predicate for the auxiliary table based upon analysis of historical workloads applied to the database.

10. The method of claim 1, further comprising performing automatic maintenance on the auxiliary table by identifying an operation performed on the RDF table that affects contents of the auxiliary table.

11. The method of claim 10, wherein the automatic maintenance is performed by configuring a trigger for the RDF table which corresponds to a triggering event for a DML operation at the RDF table and a trigger action that makes an equivalent DML operation at the auxiliary table.

12. A tangible computer program product embodied on a computer usable medium, the computer readable medium having stored thereon a sequence of instructions which, when executed by a processor causes the processor to execute a method, comprising:

maintaining an RDF (Resource Description Framework) table in a database, wherein a row in the RDF table corresponds to a separate RDF triple or RDF quad;

creating an auxiliary predicate table, wherein the auxiliary predicate table corresponds to a predicate in the RDF table;

receiving a SPARQL query directed to the RDF table;

rewriting the SPARQL query into a SQL query, wherein the SQL query is directed to at least the auxiliary table; and executing the SQL query against at least the auxiliary table to generate a query result.

13. The computer program product of claim 12, wherein the auxiliary predicate table corresponds to at least one of a single-value predicate (SVP) table, multi-value predicate (MVP) table, or predicate-chain (PCN) table.

14. The computer program product of claim 13, wherein the SVP table comprises multiple columns, where a first column in the SVP table corresponds to a first single-value predicate in the RDF table and a second column corresponds to a second single-value predicate in the RDF table.

15. The computer program product of claim 13, wherein the MVP table comprises multiple auxiliary table including a first MVP table for a first multi-value predicate in the RDF table and a second MVP table for a second multi-value predicate in the RDF table.

16. The computer program product of claim 13, wherein the PCN table comprises multiple columns, where a first column in the PCN table corresponds to a first predicate-chain element in the RDF table and a second column corresponds to a second predicate-chain element in the RDF table.

17. The computer program product of claim 12, wherein the SVP table comprises a columnar format.

18. The computer program product of claim 17, wherein the SQL query is processed against the columnar format of the SVP table by directly accessing a first subset of properties and not scanning a second subset of properties stored in the SVP table.

19. The computer program product of claim 12, wherein SQL query is directed to both the auxiliary table and the RDF table.

20. The computer program product of claim 12, wherein the sequence of instructions further performs identifying the predicate for the auxiliary table based upon analysis of historical workloads applied to the database.

21. The computer program product of claim 12, wherein the sequence of instructions further performs automatic maintenance on the auxiliary table by identifying an operation performed on the RDF table that affects contents of the auxiliary table.

22. The computer program product of claim 21, wherein the automatic maintenance is performed by configuring a trigger for the RDF table which corresponds to a triggering event for a DML operation at the RDF table and a trigger action that makes an equivalent DML operation at the auxiliary table.

23. A computer-based system, comprising:
a computer processor to execute a set of program code instructions;
a memory to hold the program code instructions, in which the program code instructions comprises program code for maintaining an RDF (Resource Description Framework) table in a database, wherein a row in the RDF table corresponds to a separate RDF triple or RDF quad; creating an auxiliary predicate table, wherein the auxiliary predicate table corresponds to a predicate in the RDF table; receiving a SPARQL query directed to the RDF table; rewriting the SPARQL query into a SQL query, wherein the SQL query is directed to at least the auxiliary table; and executing the SQL query against at least the auxiliary table to generate a query result.

24. The system of claim 23, wherein the auxiliary predicate table corresponds to at least one of a single-value predicate (SVP) table, multi-value predicate (MVP) table, or predicate-chain (PCN) table.

25. The system of claim 24, wherein the SVP table comprises multiple columns, where a first column in the SVP table corresponds to a first single-value predicate in the RDF table and a second column corresponds to a second single-value predicate in the RDF table.

26. The system of claim 24, wherein the SVP table comprises a columnar format.

27. The system of claim 26, wherein the SQL query is processed against the columnar format of the SVP table by directly accessing a first subset of properties and not scanning a second subset of properties stored in the SVP table.

28. The system of claim 24, wherein the MVP table comprises multiple auxiliary table including a first MVP table for a first multi-value predicate in the RDF table and a second MVP table for a second multi-value predicate in the RDF table.

29. The system of claim 24, wherein the PCN table comprises multiple columns, where a first column in the PCN table corresponds to a first predicate-chain element in the RDF table and a second column corresponds to a second predicate-chain element in the RDF table.

30. The system of claim 23, wherein SQL query is directed to both the auxiliary table and the RDF table.

31. The system of claim 23, wherein the program code instructions further performs identifying the predicate for the auxiliary table based upon analysis of historical workloads applied to the database.

32. The system of claim 23, wherein the program code instructions further performs automatic maintenance on the auxiliary table by identifying an operation performed on the RDF table that affects contents of the auxiliary table.

33. The system of claim 32, wherein the automatic maintenance is performed by configuring a trigger for the RDF table which corresponds to a triggering event for a DML operation at the RDF table and a trigger action that makes an equivalent DML operation at the auxiliary table.

* * * * *

UNITED STATES PATENT AND TRADEMARK OFFICE
CERTIFICATE OF CORRECTION

| | |
|---|---|
| PATENT NO. | : 11,822,531 B2 |
| APPLICATION NO. | : 17/643166 |
| DATED | : November 21, 2023 |
| INVENTOR(S) | : Das et al. |

It is certified that error appears in the above-identified patent and that said Letters Patent is hereby corrected as shown below:

On the Title Page

On page 2, Column 1, under Other Publications, Line 2, delete "WWW2012" and insert -- WWW 2012 --, therefor.

In the Specification

In Column 12, Line 6, delete "endnode" and insert -- end_node --, therefor.

In Column 12, Line 7, delete "forconstant" and insert -- for_constant --, therefor.

Signed and Sealed this
Eleventh Day of June, 2024

Katherine Kelly Vidal
*Director of the United States Patent and Trademark Office*